(12) United States Patent
Achour et al.

(10) Patent No.: US 10,942,256 B2
(45) Date of Patent: Mar. 9, 2021

(54) INTELLIGENT METAMATERIAL RADAR FOR TARGET IDENTIFICATION

(71) Applicant: Metawave Corporation, Palo Alto, CA (US)

(72) Inventors: Maha Achour, Encinitas, CA (US); Matthew Harrison, Palo Alto, CA (US)

(73) Assignee: Metawave Corporation, Carlsbad, CA (US)

( * ) Notice: Subject to any disclaimer, the term of this patent is extended or adjusted under 35 U.S.C. 154(b) by 275 days.

(21) Appl. No.: 15/983,036

(22) Filed: May 17, 2018

(65) Prior Publication Data
US 2018/0348343 A1 Dec. 6, 2018

Related U.S. Application Data

(60) Provisional application No. 62/515,045, filed on Jun. 5, 2017, provisional application No. 62/613,675, filed (Continued)

(30) Foreign Application Priority Data

May 1, 2018 (WO) ................ PCT/US2018/030541

(51) Int. Cl.
*G01S 7/41* (2006.01)
*H01Q 3/36* (2006.01)
(Continued)

(52) U.S. Cl.
CPC .............. *G01S 7/415* (2013.01); *G01S 7/292* (2013.01); *G01S 7/35* (2013.01); *G01S 7/354* (2013.01);
(Continued)

(58) Field of Classification Search
CPC ................................. G01S 7/415; G01S 7/292
See application file for complete search history.

(56) References Cited

U.S. PATENT DOCUMENTS 5,189,426 A * 2/1993 Asbury .................. G01S 13/70
342/70
6,492,949 B1 12/2002 Breglia et al.
(Continued)

FOREIGN PATENT DOCUMENTS

KR 101527771 B1 6/2015

OTHER PUBLICATIONS

Guzman-Quiros, Raul et al. "Advances in Electronically Reconfigurable LWAs in Fabry-Pérot and SIW Technologies", 7th European Conference on Antennas and Propagation, EuCAP 2013. 2001-2005.
(Continued)

*Primary Examiner* — Marcus E Windrich
(74) *Attorney, Agent, or Firm* — Sandra Lynn Godsey

(57) ABSTRACT

Examples disclosed herein relate to an Intelligent Metamaterial ("iMTM") radar for target identification. The iMTM radar has an iMTM antenna module to radiate a transmission signal with an iMTM antenna structure and generate radar data capturing a surrounding environment. An iMTM interface module detects and identifies a target in the surrounding environment from the radar data and controls the iMTM antenna module.

20 Claims, 20 Drawing Sheets

Related U.S. Application Data on Jan. 4, 2018, provisional application No. 62/651,050, filed on Mar. 30, 2018, provisional application No. 62/663,243, filed on Apr. 26, 2018, provisional application No. 62/666,666, filed on May 3, 2018.

(51) Int. Cl.

| | | |
|---|---|---|
| *G01S 7/35* | (2006.01) | |
| *H01Q 1/36* | (2006.01) | |
| *G01S 13/72* | (2006.01) | |
| *G01S 7/292* | (2006.01) | |
| *G01S 13/931* | (2020.01) | |
| *H01Q 1/32* | (2006.01) | |
| *G01S 13/32* | (2006.01) | |
| *G01S 13/58* | (2006.01) | |
| *G01S 7/288* | (2006.01) | |
| *G01S 13/02* | (2006.01) | |
| *G01S 7/03* | (2006.01) | |

(52) U.S. Cl.
CPC ............ *G01S 7/417* (2013.01); *G01S 13/726* (2013.01); *G01S 13/931* (2013.01); *H01Q 1/364* (2013.01); *H01Q 3/36* (2013.01); *G01S 7/03* (2013.01); *G01S 7/412* (2013.01); *G01S 13/32* (2013.01); *G01S 13/582* (2013.01); *G01S 13/584* (2013.01); *G01S 2007/2883* (2013.01); *G01S 2007/356* (2013.01); *G01S 2013/0245* (2013.01); *G01S 2013/93272* (2020.01); *H01Q 1/3233* (2013.01)

(56) References Cited

U.S. PATENT DOCUMENTS

| | | | |
|---|---|---|---|
| 6,768,453 B2 | 7/2004 | Solbach | |
| 7,250,908 B2 | 7/2007 | Lee | |
| 8,633,866 B2 | 1/2014 | Sarabandi et al. | |
| 8,754,810 B2 | 6/2014 | Guo et al. | |
| 9,274,222 B1* | 3/2016 | Schmalenberg | G01S 13/42 |
| 9,545,923 B2 | 1/2017 | Casse et al. | |
| 9,786,986 B2* | 10/2017 | Johnson | H01Q 13/00 |
| 10,218,067 B2* | 2/2019 | Black | H01Q 15/008 |
| 2010/0277358 A1* | 11/2010 | Duvoisin, III | G01D 15/00 342/22 |
| 2012/0229339 A1* | 9/2012 | Higgins | H01Q 1/38 342/449 |
| 2012/0274524 A1* | 11/2012 | Piazza | H01Q 3/01 343/745 |
| 2013/0237272 A1* | 9/2013 | Prasad | H01Q 3/26 455/517 |
| 2016/0011307 A1* | 1/2016 | Casse | G01S 13/931 701/93 |
| 2016/0013531 A1* | 1/2016 | Casse | H01Q 3/36 333/161 |
| 2016/0061935 A1 | 3/2016 | McCloskey et al. | |
| 2016/0134022 A1 | 5/2016 | Alexopoulos et al. | |
| 2016/0233588 A1* | 8/2016 | Bily | H01Q 21/065 |

OTHER PUBLICATIONS

Wang, Yifu et al. "Tunable I-shaped metamaterial by loading varactor diode for reconfigurable antenna", Applied Physics A, May 26, 2011, 1243-1247.

Zhang, Miao et al. "Design of a Double-Layer Slotted Waveguide Array with a Partially Corporate Feed Circuit Installed in the Bottom Layer and its Fabrication by Diffusion Bonding of Laminated Thin Plates in 38GHz Band" The 2009 International Symposium on Antennas and Propogation, ISAP Oct. 20-23, 2009. 373-376.

Koch, R. et al. "Detection and Purging of Specular Reflective and Transparent Object Influences in 3D Range Measurements" ISPRS—International Archives of the Photogrammetry, Remote Sensing and Spatial Information Sciences, vol. XLII-2/W3, 2017, pp. 377-384.

Mnih, V. et al. "Human-level control through deep reinforcement learning" Nature. Feb. 26, 2015, 529-33.

Limberger, F. et al. "Real-Time Detection of Planar Regions in Unorganized Point Clouds" Pattern Recognition, Jun. 2015, 48(6).

Seyfioglu, M. S., et al. "Deep Convolutional Autoencoder for Radar-Based Classification of Similar Aided and Unaided Human Activities" IEEE Transactions on Aerospace and Electronic Systems, Feb. 2018. pp. 1-1.

Zhou, Y. et al. "VoxelNet: End-to-End Learning for Point Cloud Based 3D Object Detection" Nov. 2017. pp. 1-10.

\* cited by examiner

THREE LAYER, PROBE FED MTM ANTENNA STRUCTURE

TWO LAYER, PROBE FED MTM ANTENNA STRUCTURE

INTELLIGENT METAMATERIAL RADAR FOR TARGET IDENTIFICATION

CROSS-REFERENCE TO RELATED APPLICATIONS

This application claims priority to PCT Application No. PCT/US18/30541, filed on May 1, 2018, which itself claims priority to U.S. Provisional Application No. 62/515,045, filed on Jun. 5, 2017. This application also claims priority to U.S. Provisional Application No. 62/613,675, filed on Jan. 4, 2018, U.S. Provisional Application No. 62/651,050, filed on Mar. 30, 2018, U.S. Provisional Application No. 62/663,243, filed on Apr. 26, 2018, and U.S. Provisional Application No. 62/666,666, filed on May 3, 2018. These applications are incorporated herein by reference.

BACKGROUND

Autonomous driving is quickly moving from the realm of science fiction to becoming an achievable reality. Already in the market are Advanced-Driver Assistance Systems ("ADAS") that automate, adapt and enhance vehicles for safety and better driving. The next step will be vehicles that increasingly assume control of driving functions such as steering, accelerating, braking and monitoring the surrounding environment and driving conditions to respond to events, such as changing lanes or speed when needed to avoid traffic, crossing pedestrians, animals, and so on.

An aspect of making this work is the ability to detect and classify targets in the surrounding environment at the same or possibly even better level as humans. Humans are adept at recognizing and perceiving the world around them with an extremely complex human visual system that essentially has two main functional parts: the eye and the brain. In autonomous driving technologies, the eye may include a combination of multiple sensors, such as camera, radar, and lidar, while the brain may involve multiple artificial intelligence, machine learning and deep learning systems. The goal is to have full understanding of a dynamic, fast-moving environment in real time and human-like intelligence to act in response to changes in the environment.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

Figure 1:
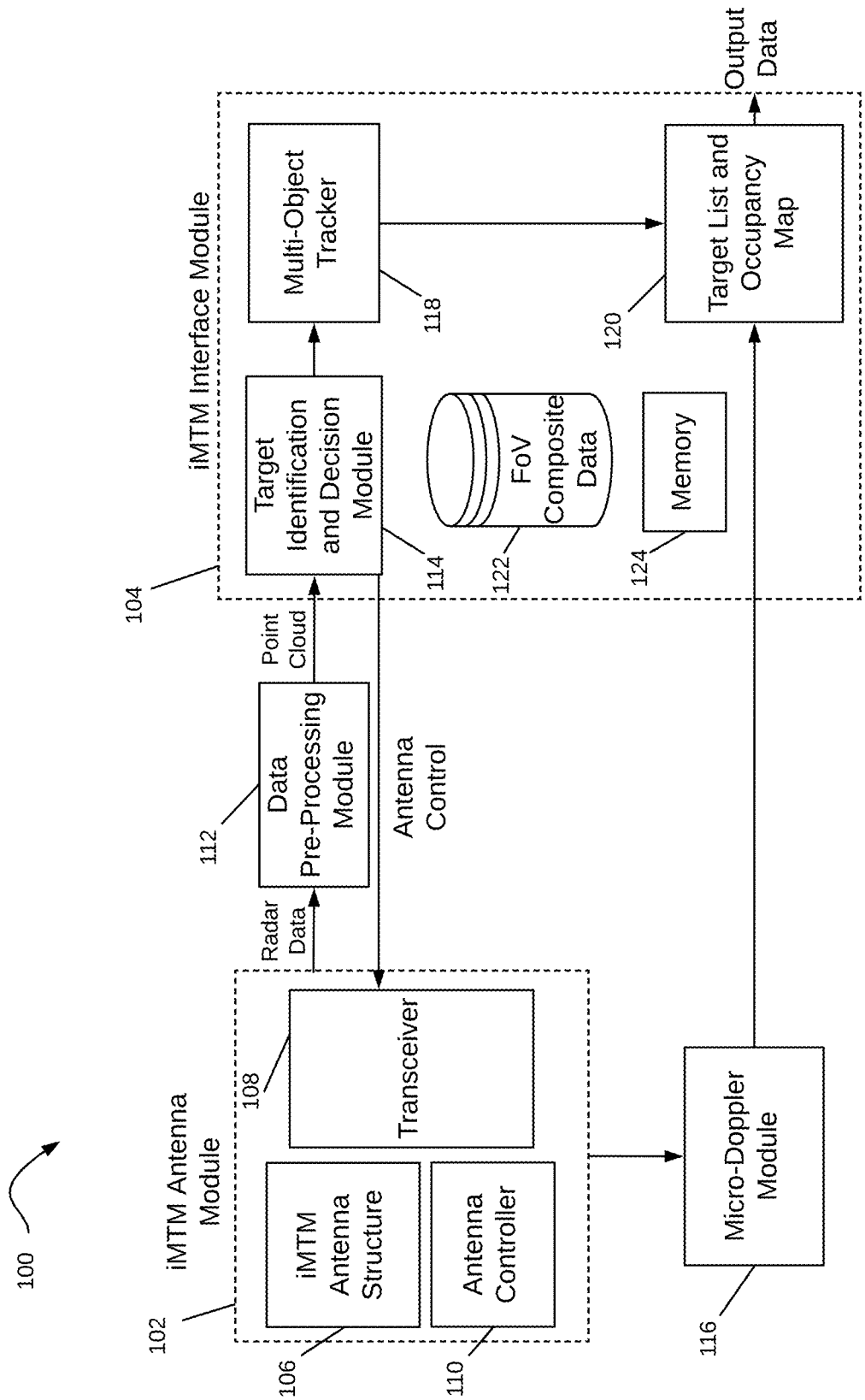
FIG. 1 illustrates a schematic diagram of an iMTM radar system for use in an autonomous driving system in accordance with various examples.

Systems and methods for an Intelligent Metamaterial ("iMTM") radar for target detection and identification are disclosed. The systems and methods are suitable for many different applications and can be deployed in a variety of different environments and configurations. In various examples, the systems and method are used in an autonomous driving vehicle to detect and identify targets in the vehicle's path and surrounding environment. The targets may include structural elements in the environment such as roads, walls, buildings, road center medians and other objects, as well as vehicles, pedestrians, bystanders, cyclists, plants, trees, animals and so on.

The iMTM radar is a "digital eye" with true 3D vision and capable of a human-like interpretation of the world. The digital eye and human-like interpretation capabilities are provided by two main modules: an iMTM Antenna Module and an iMTM Interface Module. The iMTM antenna module is based on a dynamically controllable antenna structure with metamaterial antenna arrays capable of providing a 360° view of a vehicle's path and surrounding environment. The iMTM interface module receives data from the iMTM antenna module corresponding to a Field of View ("FoV") and is trained to detect and identify targets thereon. The iMTM interface module can also control the iMTM antenna module as desired.

In various examples, the control of the iMTM antenna module may involve changing the electrical or electromagnetic configuration of the metamaterial antenna arrays. This may be accomplished, for example, with the use of varactors to enable adjustment of radiation patterns from the antenna arrays in the iMTM antenna module. Each antenna array is an array of individual antenna elements including intelligent metamaterial cells ("iMTM cells"). In various examples, the iMTM cells may be configured into subarrays that have specific characteristics.

For use in an autonomous driving vehicle, the iMTM radar system may perform a coarse focus with a large beam width as an ambient condition, and then narrow the beam width when an echo is received, indicating a target is within the FoV of the radiation patterns. In this way, the larger beam width may sweep the full FoV of the iMTM antenna module, reducing the time to scan the FoV. In some examples, the iMTM interface module is able to detect the area of the FoV showing a target and map that to a specific configuration of iMTM cells and/or subarrays to focus a beam, i.e., narrow the beam width. Additionally, in some examples, the specific dimensions and other properties of a detected target, such as traveling velocity with respect to the antenna structure, are analyzed and a next action(s) or course of action(s) is determined. The detected target in some examples is then provided as a visual or graphic display, which may act as a back-up security feature for a passenger in the autonomous driving vehicle.

It is appreciated that, in the following description, numerous specific details are set forth to provide a thorough understanding of the examples. However, it is appreciated that the examples may be practiced without limitation to these specific details. In other instances, well-known methods and structures may not be described in detail to avoid unnecessarily obscuring the description of the examples. Also, the examples may be used in combination with each other.

FIG. 1 illustrates a schematic diagram of an iMTM radar system for use in an autonomous driving system in accordance with various examples. iMTM radar system 100 is a "digital eye" with true 3D vision and capable of a human-like interpretation of the world. The "digital eye" and human-like interpretation capabilities are provided by two main modules: iMTM Antenna Module 102 and iMTM Interface Module 104.

iMTM antenna module 102 has an iMTM antenna structure 106 to radiate dynamically controllable and highly-directive RF beams using metamaterials. A transceiver module 108 coupled to the iMTM antenna structure 106 prepares a signal for transmission, such as a signal for a radar device, wherein the signal is defined by modulation and frequency. The signal is provided to the iMTM antenna structure 106 through a coaxial cable or other connector and propagates through the structure for transmission through the air via RF beams at a given phase, direction, and so on. The RF beams and their parameters (e.g., beam width, phase, azimuth and elevation angles, etc.) are controlled by antenna controller 110, such as at the direction of iMTM interface module 104.

The RF beams reflect off of targets in the vehicle's path and surrounding environment and the RF reflections are received by the transceiver module 108. Radar data from the received RF beams is provided to the iMTM interface module 104 for target detection and identification. A data pre-processing module 112 processes the radar data to encode it into a point cloud for the iMTM interface module 104. In various examples, the data pre-processing module 112 could be a part of the iMTM antenna module 102 or the iMTM interface module 104, such as on the same circuit board as the other modules within the iMTM antenna or interface modules 102-104. The radar data may be organized in sets of Range-Doppler ("RD") map information, corresponding to 4D information that is determined by each RF beam radiated off of targets, such as azimuthal angles, elevation angles, range and velocity. The RD maps may be extracted from Frequency-Modulated Continuous Wave ("FMCW") radar pulses and contain both noise and systematic artifacts from Fourier analysis of the pulses. The iMTM interface module 104 controls further operation of the iMTM antenna module 102 by, for example, providing beam parameters for the next RF beams to be radiated from the iMTM cells in the iMTM antenna structure 106.

In operation, the antenna controller 110 is responsible for directing the iMTM antenna structure 106 to generate RF beams with determined parameters such as beam width, transmit angle, and so on. The antenna controller 110 may, for example, determine the parameters at the direction of iMTM interface module 104, which may at any given time want to focus on a specific area of a FoV upon identifying targets of interest in the vehicle's path or surrounding environment. The antenna controller 110 determines the direction, power, and other parameters of the beams and controls the iMTM array structure 106 to achieve beam steering in various directions. The antenna controller 110 also determines a voltage matrix to apply to capacitance control mechanisms coupled to the iMTM array structure 106 to achieve a given phase shift. In some examples, the iMTM array structure 106 is adapted to transmit a directional beam through active control of the reactance parameters of the individual iMTM cells that make up the iMTM antenna structure 106. iMTM interface module 104 provides control actions to the antenna controller 110 at the direction of the Target Identification and Decision Module 114.

Next, the iMTM antenna structure 106 radiates RF beams having the determined parameters. The RF beams are reflected off of targets in and around the vehicle's path (e.g., in a 360° field of view) and are received by the transceiver module 108 in iMTM antenna module 102. The antenna module 102 then transmits 4D radar data to the data pre-processing module 112 for generating a point cloud that is then sent to the iMTM interface module 104. A micro-doppler module 116 coupled to the iMTM antenna module 102 and the iMTM interface module 104 extracts micro-doppler signals from the 4D radar data to aid in the identification of targets by the iMTM interface module 104. The micro-doppler module 116 takes a series of RD maps from the iMTM antenna module 102 and extracts a micro-doppler signal from them. The micro-doppler signal enables a more accurate identification of targets as it provides information on the occupancy of a target in various directions. Non-rigid targets such as pedestrians, cyclists are known to exhibit a time-varying doppler signature due to swinging arms, legs, etc. By analyzing the frequency of the returned radar signal over time, it is possible to determine the class of the target (i.e., whether a vehicle, pedestrian, cyclist, animal, etc.) with over 90% accuracy. Further, as this classification may be performed by a linear Support Vector Machine ("SVM"), it is extremely computationally efficient. In various examples, the micro-doppler module 116 could be a part of the iMTM antenna module 102 or the iMTM interface module 104, such as on the same circuit board as the other modules within the iMTM antenna or interface modules 102-04.

The target identification and decision module 114 receives the point cloud from the data pre-processing module 112, processes the point cloud to detect and identify targets, and determines the control actions to be performed by the iMTM antenna module 102 based on the detection and identification of such targets. For example, the target identification and decision module 114 may detect a cyclist on the path of the vehicle and direct the iMTM antenna module 102, at the instruction of its antenna controller 110, to focus additional RF beams at a given phase shift and direction within the portion of the FoV corresponding to the cyclist's location.

The iMTM interface module 104 also includes a multi-object tracker 118 to track the identified targets over time, such as, for example, with the use of a Kalman filter. The multi-object tracker 118 matches candidate targets identified by the target identification and decision module 114 with targets it has detected in previous time windows. By combining information from previous measurements, expected measurement uncertainties, and some physical knowledge, the multi-object tracker 118 generates robust, accurate estimates of target locations.

Information on identified targets over time are then stored at a Target List and Occupancy Map 120, which keeps tracks of targets' locations and their movement over time as determined by the multi-object tracker 118. The tracking information provided by the multi-object tracker 118 and the micro-doppler signal provided by the micro-doppler module 116 are combined to produce an output containing the type of target identified, their location, their velocity, and so on. This information from iMTM radar system 100 is then sent to a sensor fusion module (described in more detail below with reference to FIG. 12) in the vehicle, where it is processed together with information from other sensors in the vehicle.

In various examples, an FoV composite data unit 122 stores information that describes a FoV. This may be historical data used to track trends and anticipate behaviors and traffic conditions or may be instantaneous or real-time data that describes the FoV at a moment in time or over a window in time. The ability to store this data enables the iMTM interface module 104 to make decisions that are strategically targeted at a particular point or area within the FoV. For example, the FoV may be clear (no echoes received) for five minutes, and then one echo arrives from a specific region in the FoV; this is similar to detecting the front of a car. In response, the iMTM interface module 104 may determine to narrow the beam width for a more focused view of that sector or area in the FoV. The next scan may indicate the targets' length or other dimension, and if the target is a car, the iMTM interface module 104 may consider what direction the target is moving and focus the beams on that area. Similarly, the echo may be from a spurious target, such as a bird, which is small and moving quickly out of the path of the car. There are a variety of other uses for the FoV composite data 122, including the ability to identify a specific type of target based on previous detection. A memory 124 stores useful data for iMTM radar system 100, such as, for example, information on which subarrays of the iMTM antenna structure 106 perform better under different conditions.

In various examples described herein, the use of iMTM radar system 100 in an autonomous driving vehicle provides a reliable way to detect targets in difficult weather conditions. For example, historically a driver will slow down dramatically in thick fog, as the driving speed decreases with decreases in visibility. On a highway in Europe, for example, where the speed limit is 115 km/h, a driver may need to slow down to 40 km/h when visibility is poor. Using the iMTM radar system 100, the driver (or driverless vehicle) may maintain the maximum safe speed without regard to the weather conditions. Even if other drivers slow down, a vehicle enabled with the iMTM radar system 100 will be able to detect those slow-moving vehicles and obstacles in the way and avoid/navigate around them.

Additionally, in highly congested areas, it is necessary for an autonomous vehicle to detect targets in sufficient time to react and take action. The examples provided herein for an iMTM radar system increase the sweep time of a radar signal so as to detect any echoes in time to react. In rural areas and other areas with few obstacles during travel, the iMTM interface module 104 adjusts the focus of the beam to a larger beam width, thereby enabling a faster scan of areas where there are few echoes. The iMTM interface module 104 may detect this situation by evaluating the number of echoes received within a given time period and making beam size adjustments accordingly. Once a target is detected, the iMTM interface module 104 determines how to adjust the beam focus. This is achieved by changing the specific configurations and conditions of the iMTM antenna structure 106. For example, in one scenario the voltages on the varactors are adjusted. In another scenario, a subset of iMTM unit cells is configured as a subarray. This configuration means that this set may be treated as a single unit, and all the varactors are adjusted similarly. In another scenario, the subarray is changed to include a different number of unit cells, where the combination of iMTM unit cells in a subarray may be changed dynamically to adjust to conditions and operation of the system.

All of these detection scenarios, analysis and reactions may be stored in the iMTM interface module 104 and used for later analysis or simplified reactions. For example, if there is an increase in the echoes received at a given time of day or on a specific highway, that information is fed into the antenna controller 110 to assist in proactive preparation and configuration of the iMTM antenna structure 106. Additionally, there may be some subarray combinations that perform better, such as to achieve a desired result, and this is stored in the memory 124.

Figure 2:
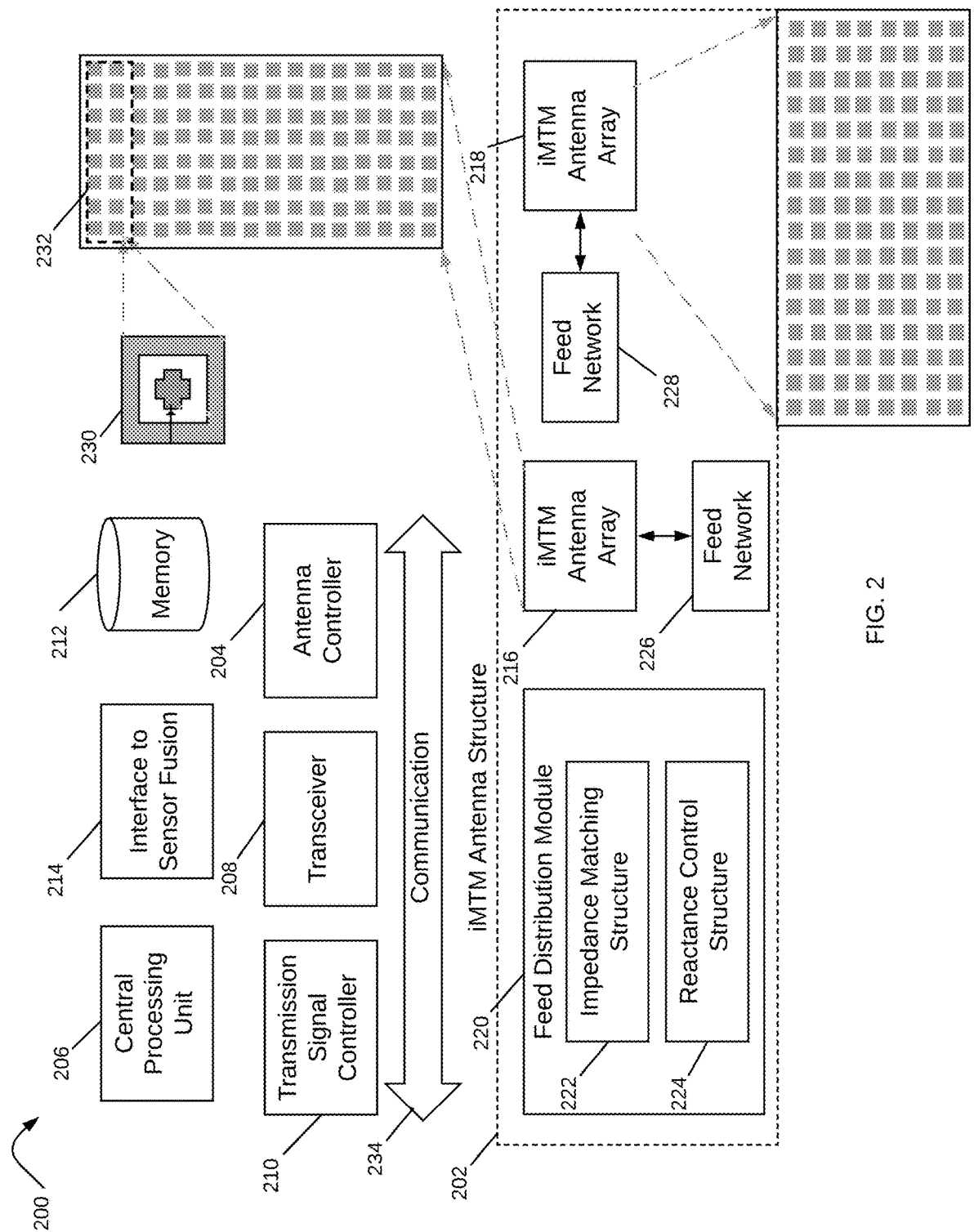
FIG. 2 is a schematic diagram of an iMTM antenna structure for use with the iMTM radar system of FIG. 1 in accordance with various examples.

Attention is now directed at FIG. 2, which shows a schematic diagram of an iMTM antenna module for use with the iMTM radar system of FIG. 1 in accordance with various examples. iMTM antenna module 200 has an iMTM antenna structure 202 coupled to an antenna controller 204, a central processor 206, and a transceiver 208. A transmission signal controller 210 generates the specific transmission signal, such as an FMCW signal, which is used for radar sensor applications as the transmitted signal is modulated in frequency, or phase. The FMCW signal enables a radar to measure range to a target by measuring the phase differences in phase or frequency between the transmitted signal and the received or reflected signal. Within FMCW formats, there are a variety of modulation patterns that may be used within FMCW, including triangular, sawtooth, rectangular and so forth, each having advantages and purposes. For example, sawtooth modulation may be used for large distances to a target; a triangular modulation enables use of the Doppler frequency, and so forth.

Other modulation types may be incorporated according to the desired information and specifications of a system and application. For example, the transmission signal controller 210 may also generate a cellular modulated signal, such as an Orthogonal Frequency Division Multiplexing ("OFDM") signal. In some examples, the signal is provided to the iMTM antenna module 200 and the transmission signal controller 210 may act as an interface, translator or modulation controller, or otherwise as required for the signal to propagate through a transmission line system. The received information is stored in a memory storage unit 212, wherein the information structure may be determined by the type or transmission and modulation pattern.

The iMTM antenna structure 202 radiates the signal to a radiating array of iMTM cells in the iMTM antenna arrays 216-18. In various examples, the iMTM antenna structure 202 includes a feed distribution module 220, having an impedance matching structure 222 and a reactance control structure 224. The reactance control structure 224 includes a capacitance control mechanism controlled by antenna controller 204, which may be used to control the phase of a radiating signal from radiating array structures, such as iMTM antenna arrays 216-18.

In operation, the antenna controller 204 receives information from other modules in iMTM antenna module 200 and/or from iMTM interface module 104 in FIG. 1 indicating a next radiation beam, wherein a radiation beam may be specified by parameters such as beam width, transmit angle, transmit direction and so forth. The antenna controller 204 determines a voltage matrix to apply to the reactance control mechanisms in iMTM antenna structure 202 to achieve a given phase shift or other parameters. In these examples, the iMTM antenna structure 202 is adapted to transmit a directional beam without using digital beam forming methods, but rather through active control of the reactance parameters of the individual iMTM cells that make up each iMTM antenna array 216-18.

Transceiver 208 prepares a signal for transmission, such as a signal for a radar device, wherein the signal is defined by modulation and frequency. The signal is received by the iMTM antenna structure 202 and the phase of the iMTM cells in the iMTM antenna arrays 216-18 is adjusted at the direction of the antenna controller 204. In some examples, transmission signals are received by a portion, or subarray (s), of the iMTM antenna arrays 216-18 (e.g., subarray 232). These iMTM antenna arrays 216-18 are applicable to many applications, including radar, cellular antennas, and autonomous vehicles to detect and identify targets in the path of or surrounding the vehicle. Alternate examples may use the iMTM antenna arrays 216-18 for wireless communications, medical equipment, sensing, monitoring, and so forth. Each application type incorporates designs and configurations of the elements, structures and modules described herein to accommodate their needs and goals.

In iMTM antenna module 200, a signal is specified by antenna controller 204, which may be at the direction of an iMTM interface module (e.g., iMTM interface module 104 in FIG. 1), a sensor fusion module (described below with reference to FIG. 12) via interface to sensor fusion 214, or it may be based on program information from memory storage 212. There are a variety of considerations to determine the beam formation, wherein this information is provided to antenna controller 204 to configure the various elements of iMTM antenna arrays 216-18, which are described herein. The transmission signal controller 210 generates the transmission signal and provides it to the feed distribution module 220, which then provides it to feed networks 226-28 coupled to iMTM antenna arrays 216-18. Feed networks 226-28 may include a plurality of transmission lines configured with discontinuities within a conductive material.

The feed distribution module 220 has an impedance matching structure 222 and a reactance control structure 224 for respectively matching input signal parameters with the iMTM cells and providing phase shift control to each cell. The impedance matching structure 222 may include a directional coupler having an input port to each of adjacent transmission lines in the feed networks 226-28. The adjacent transmission lines in feed networks 226-28 and the impedance matching structure 222 may form a super element, wherein an adjacent transmission line pair has a specific phase difference, such as a 90° phase difference with respect to each other.

The impedance matching structure 222 works in coordination with the reactance control structure 224 to provide phase shifting of the radiating signal(s) from the iMTM antenna arrays 216-18. In various examples, the reactance control structure 224 includes a reactance control mechanism controlled by antenna controller 204, which may be used to control the phase of a radiating signal from the iMTM cells in arrays 216-18 and to adjust the effective reactance of a transmission line and/or a cell fed by a transmission line in the feed networks 226-28. The reactance control structure 224 may, for example, include a phase shift network system (not shown) to provide any desired phase shift up to 360°. The phase shift network system may include multiple varactors to achieve the desired phase shift.

One or more reactance control mechanisms may be placed within a transmission line in the feed networks 226-28. Similarly, reactance control mechanisms may be placed within multiple transmission lines or within each iMTM radiating cell to achieve a desired result. The reactance control mechanisms may have individual controls or may have a common control. In some examples, a modification to a first reactance control mechanism is a function of a modification to a second reactance control mechanism.

The impedance matching element 222 and the reactance control element 224 may be positioned within the architecture of feed distribution module 220; one or both may be external to the feed distribution module 220 for manufacture or composition as an antenna or radar module. The impedance matching element 222 works in coordination with the reactance control element 224 to provide phase shifting of the radiating signal(s) from iMTM antenna arrays 216-18.

As illustrated, iMTM antenna structure 200 includes the iMTM antenna arrays 216-18, composed of individual iMTM cells such as iMTM cell 230. The iMTM antenna arrays 216-18 may take a variety of forms and are designed to operate in coordination with the feed distribution module 220, wherein individual iMTM cells correspond to elements within the iMTM transmission arrays 216-18. In various examples, the transmission signals sent by the transceiver 208 are received by a portion, or subarray, of iMTM antenna arrays 216-18 (e.g., subarray 232). Each of the iMTM antenna arrays 216-18 is an array of individual iMTM radiating cells (e.g., an 8×16 array), wherein each of the iMTM cells (e.g., MTM cell 230) has a uniform size and shape; however, some examples may incorporate different sizes, shapes, configurations and array sizes.

Each iMTM cell (e.g., iMTM cell 230) is an artificially structured element used to control and manipulate physical phenomena, such as electromagnetic ("EM") properties of a signal including the amplitude, phase, and wavelength. Metamaterial structures behave as derived from inherent properties of their constituent materials, as well as from the geometrical arrangement of these materials with size and spacing that are much smaller relative to the scale of spatial variation of typical applications. A metamaterial is not a tangible new material, but rather is a geometric design of known materials, such as conductors, that behave in a specific way. An iMTM cell such as cell 230, may be composed of multiple microstrips, gaps, patches, vias, and so forth having a behavior that is the equivalent to a reactance element, such as a combination of series capacitors and shunt inductors. Various configurations, shapes, designs and dimensions are used to implement specific designs and meet specific constraints. In some examples, the number of dimensional freedom determines the characteristics, wherein a device having a number of edges and discontinuities may model a specific-type of electrical circuit and behave in a similar manner. In this way, an iMTM cell radiates according to its configuration. Changes to the reactance parameters of the iMTM cell change the radiation pattern. Where the radiation pattern is changed to achieve a phase change or phase shift, the resultant structure is a powerful antenna or radar, as small changes to the iMTM cell result in large changes to the beamform.

The iMTM cells include a variety of conductive structures and patterns, such that a received transmission signal is radiated therefrom. In various examples, each iMTM cell (e.g., cell 230) has some unique properties. These properties may include a negative permittivity and permeability resulting in a negative refractive index; these structures are commonly referred to as left-handed materials ("LHM"). The use of LHM enables behavior not achieved in classical structures and materials, including interesting effects that may be observed in the propagation of electromagnetic waves, or transmission signals. Metamaterials can be used for several interesting devices in microwave and terahertz engineering such as antennas, sensors, matching networks, and reflectors, such as in telecommunications, automotive and vehicular, robotic, biomedical, satellite and other applications. For antennas, metamaterials may be built at scales much smaller than the wavelengths of transmission signals radiated by the metamaterial. Metamaterial properties come from the engineered and designed structures rather than from the base material forming the structures. Precise shape, dimensions, geometry, size, orientation, arrangement and so forth result in the smart properties capable of manipulating EM waves by blocking, absorbing, enhancing, or bending waves.

The iMTM antenna arrays 216-18 may have a periodic arrangement (e.g., array, lattice, etc.) of iMTM cells that are each smaller than the transmission wavelength. When a transmission signal is provided to the iMTM antenna structure 202, such as through a coaxial cable or other connector, the signal propagates through the feed distribution module 220 to the iMTM transmission arrays 216-18 for transmission through the air.

Note that as illustrated, there are two iMTM antenna arrays 216-18. However, iMTM antenna structure 202 may incorporate multiple other antenna arrays. In various examples, each iMTM antenna array may be for transmission and/or receiving of radiation patterns, where at least one of the arrays is for transmission in the azimuth, or horizontal, direction, and at least another is for receiving of radiation patterns over the elevation of the array, with the antenna arrays having orthogonal radiation beams. Note also that the iMTM antenna arrays 216-18 are shown with separate feed networks 226-28, but could in some examples, share a feed network. In various examples, antenna arrays may be configured to detect different targets, e.g., a set of antenna arrays may be configured to enhance the detection and identification of pedestrians, another set of antenna arrays may be configured to enhance the detection and identification of other vehicles, and so forth. In the case of pedestrians, the configuration of the antenna arrays may include power amplifiers to adjust the power of a transmitted signal and/or different polarization modes for different arrays to enhance pedestrian detection.

Figure 3:
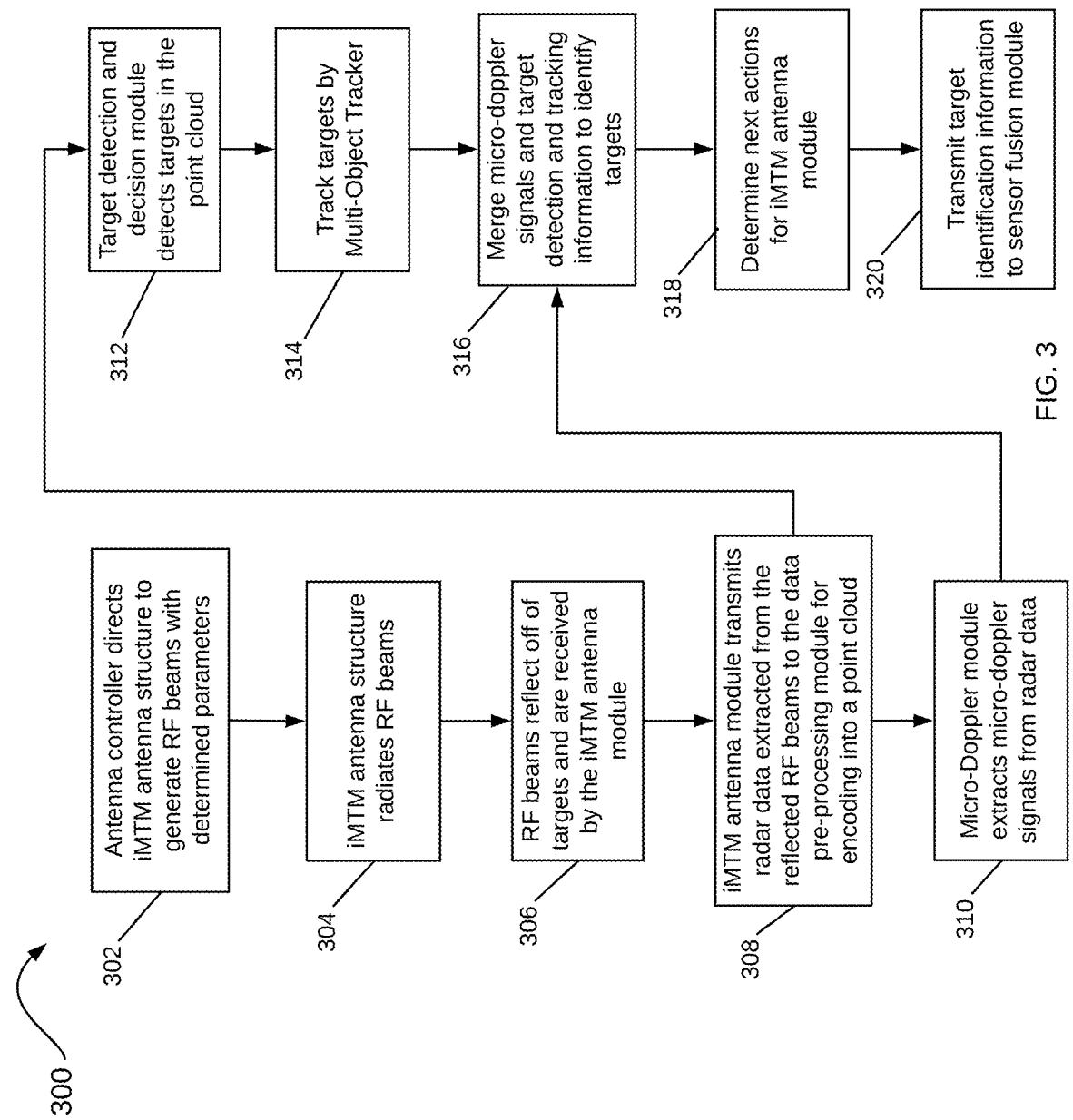
FIG. 3 is a flowchart illustrating the operation of an example iMTM radar system in more detail.

Referring now to FIG. 3, a flowchart illustrating the operation of an example iMTM radar system in more detail is described. In one example, the iMTM radar system may be implemented as the iMTM radar system 100 of FIG. 1. In operation, the antenna controller 110 is responsible for directing the iMTM antenna structure 106 to generate RF beams with determined parameters such as beam width, transmit angle, etc. (302). The antenna controller 110 may, for example, determine the parameters at the direction of iMTM interface module 104, which may at any given time want to focus on a specific area of a FoV upon identifying targets of interest in the vehicle's path. The antenna controller 110 determines the direction, power, and other parameters of the beams and controls the iMTM antenna structure 106 to achieve beam steering in various directions. The antenna controller 110 also determines a voltage matrix to apply to capacitance control mechanisms in the iMTM antenna structure 106 (or coupled to the iMTM antenna structure 106) to achieve a given phase shift. In some examples, the iMTM antenna structure 106 is adapted to transmit a directional beam through active control of the reactance parameters of the individual iMTM cells in the iMTM antenna arrays (e.g., arrays 216-18) of the iMTM array structure 106. The iMTM interface module 102 provides control actions to the antenna controller 110 at the direction of the target identification and decision module 114, described in more detail below.

Next, the iMTM antenna structure 106 radiates RF beams having the determined parameters (304). The RF beams are reflected off of targets in and around the vehicle's path (e.g., in a 360° field of view) and are received by the transceiver module 108 in the iMTM antenna module 102 (306). The iMTM antenna module 102 then transmits 4D radar data to the data pre-processing module 112 for encoding into a point cloud (308). The micro-doppler module 116 coupled to the iMTM antenna module 102 and the iMTM interface module 104 extracts micro-doppler signals from the 4D radar data to aid in the identification of targets by the target identification and decision module 114 (310). The micro-doppler module 116 takes a series of RD maps from the iMTM antenna module 102 and extracts a micro-doppler signal from them. The micro-doppler signal enables a more accurate identification of targets as it provides information on the occupancy of a target in various directions.

The target identification and decision module 114 receives the 4D radar data from the iMTM antenna module 102, processes the radar data to detect and identify targets, and determines the control actions to be performed by the iMTM antenna module 102 based on the detection and identification of such targets (312). For example, the target identification and decision module 114 may detect a cyclist on the path of the vehicle and direct the iMTM antenna module 102, at the instruction of its antenna controller 110, to focus additional RF beams at given phase shift and direction within the portion of the field of view corresponding to the cyclist's location.

The iMTM interface module 104 also includes a multi-object tracker 118 to track the identified targets over time, such as, for example, with the use of a Kalman filter (314). Information on identified targets over time are stored at a target list and occupancy map 120, which keeps tracks of targets' locations and their movement over time as determined by the multi-object tracker 118. The tracking information provided by the multi-object tracker 118 and the micro-doppler signal provided by the micro-doppler module 116 are combined to produce an output containing the type of target identified, their location, their velocity, and so on (316). This information from iMTM interface module 104 is then used to determine next actions to be performed by the iMTM antenna module 102 such as what beams to send next and with which parameters (e.g., beam width, azimuth and elevation angles, etc.) (318). The determination may also include a selection of subarrays in the iMTM antenna arrays in the iMTM antenna module 102 from which to send the next beams. The output from the iMTM interface module 104 is also sent to a sensor fusion module (described in more detail below with reference to FIG. 12) where it is processed together with information from other sensors in the vehicle (320).

Figure 4:
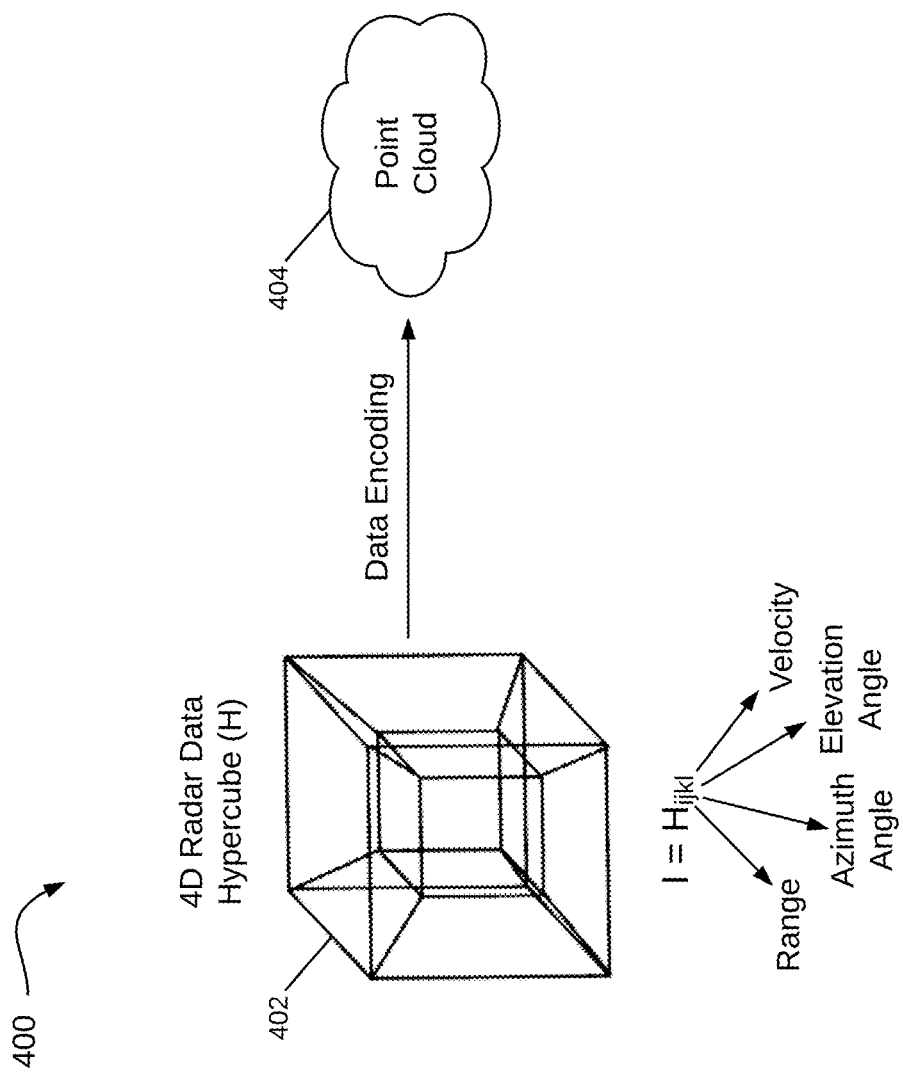
FIG. 4 illustrates the encoding of 4D radar data into a point cloud in accordance with various examples.

FIG. 4 illustrates the encoding of 4D radar data into a point cloud in accordance with various examples. The 4D radar data generated by an iMTM antenna module (e.g., iMTM antenna module 102 of iMTM radar system 100 of FIG. 1) can be represented in a 4D hypercube H 402. Each point in the hypercube H corresponds to an intensity value I at a given range r, azimuth angle ϕ, elevation angle θ, and velocity v. The data in hypercube H may be extracted from FMCW radar pulses and contain both noise and systematic artifacts from Fourier analysis of the pulses. In order to detect and identify targets in the 4D radar data represented by hypercube H in real-time, it is beneficial to encode the hypercube into a point cloud 404. In some examples, this may be accomplished by reducing the 4D data set into a point cloud by aggregating the 4D data and extracting values that may correspond to targets for identification. In one example, 4D radar data can be encoded by first noticing that for every range r, the iMTM radar system may measure multiple velocities (e.g., from reflections returned from the ground and targets or background). The 4D radar data is a series of RD maps for multiple angles/beams that can be encoded to isolate the specific ranges, angles and velocities where targets are identified.

Figure 5:
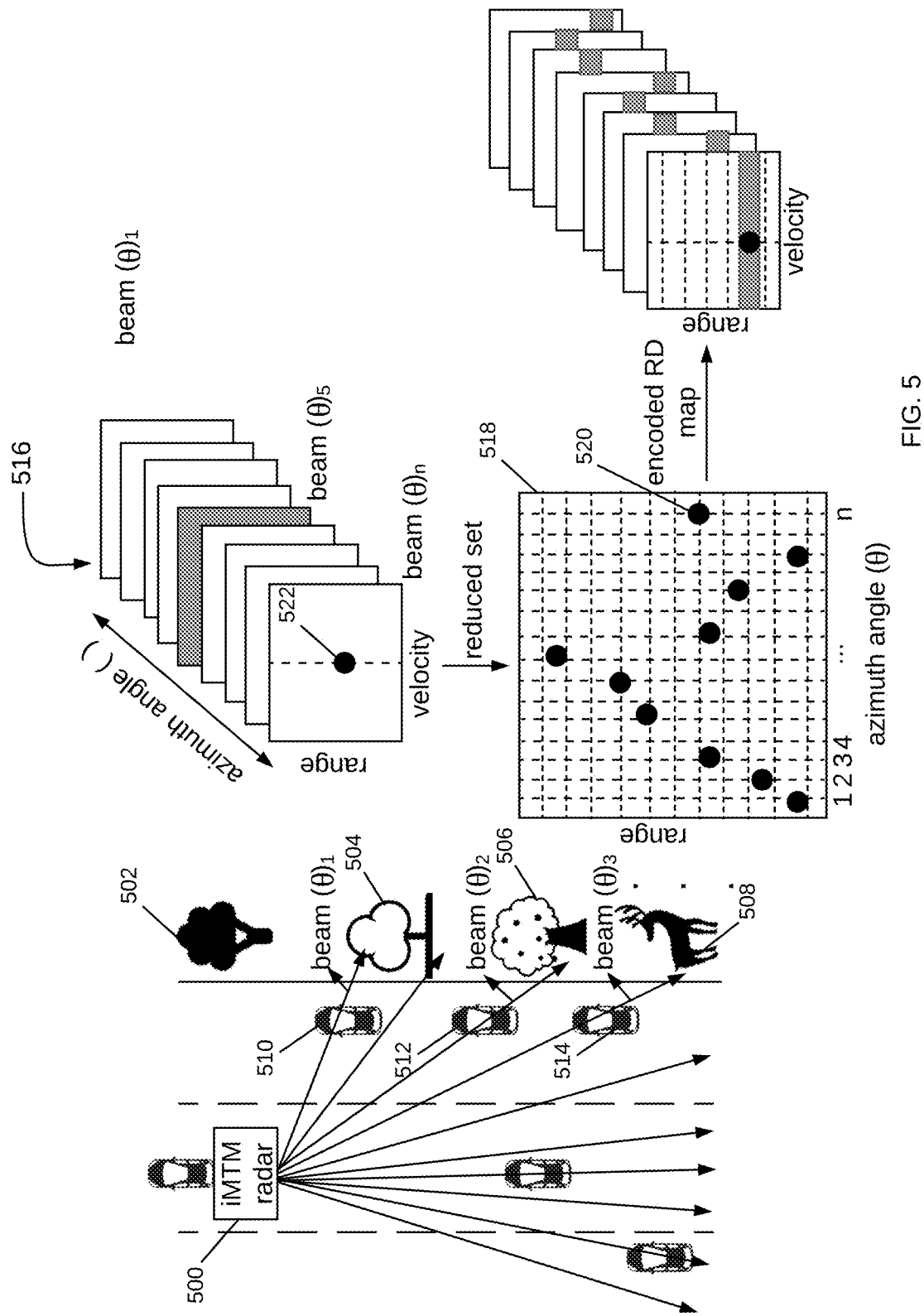
FIG. 5 illustrates an example data encoding to generate a point cloud from 4D radar data.

FIG. 5 illustrates an example data encoding to generate a point cloud from 4D radar data. In the scenario of FIG. 5, iMTM radar 500 is positioned in a vehicle ahead of the traffic. There are trees (e.g., trees 502-06), a deer 508, and other objects such as road signs, road markings, road barriers and so on. The iMTM radar 500 transmits radar beams towards oncoming traffic as a scan, referred to as a raster scan across the azimuth. For illustration purposes, the scan is at a single elevation; however, iMTM radar 500 can transmit scans across the elevation spectrum to capture a 360° FoV.

Each beam gets reflected off as it hits targets. For example, beam $(\theta)_1$ is reflected off car 510 and tree 504, beam $(\theta)_2$ is reflected off car 512 and tree 506, beam $(\theta)_3$ is reflected off car 514 and deer 508, and so on, continuing across the FoV. Each of the individual beams has a corresponding RD map. The set of "slices" or RD maps 516 represents a set of ranges and velocities for each azimuth angle θ. Some of the slices may not have any meaningful data as the corresponding beam may not have hit any targets. The first step in the data encoding of the RD data into a point cloud is to isolate the specific ranges and azimuth angles where targets are present and can be identified. To illustrate this process, consider the mapping 518, where targets are plotted according to azimuth angle and range. In the mapping 518, azimuth angles θ are numbered from 1 to n, corresponding to the ordering of beams from iMTM radar 500. For beam $(\theta)_n$ and velocity range $r_1$, there is a marking 520, which corresponds to target 522 in a first slice of slices 516. Each slice may have a range identified wherein a target is detected. The slices within slices 516 that had no target identified are removed from the data set to reduce processing.

Note that in the case that multiple contiguous pixels (or voxels) indicate the presence of an object, they are aggregated using prepacked blob image analysis, and the blob center of mass is selected. Another option would be to average the RD maps from all of the highlighted pixels (voxels). The simplest approach, is to simply take the velocity corresponding to the maximum intensity of return signal. Note also that while there may be multiple objects which differ only by their r, θ, or ϕ coordinate, there cannot be two targets which have the same (r, θ, ϕ) but different velocities (since two targets cannot occupy the same space at the same time and be differentiated with sub-pixel or sub-voxel precision). That is, the rest of the velocity information can be discarded and the encoded RD data is therefore a set with only the valuable information for processing and target identification.

Figure 6:
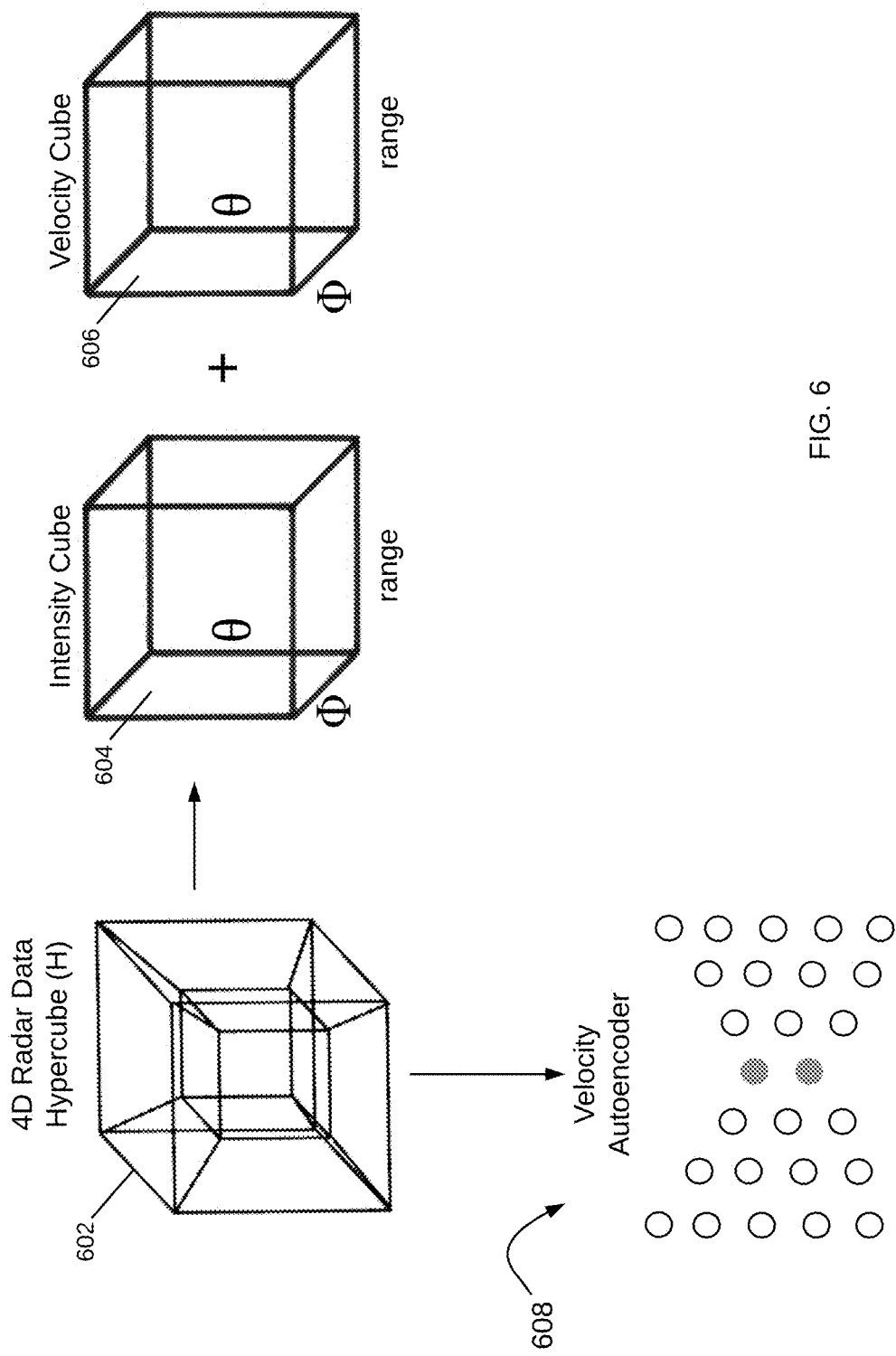
FIG. 6 illustrates other example data encodings to generate a point cloud from 4D radar data.

FIG. 6 illustrates other example data encodings to generate a point cloud from 4D radar data. In one example, hypercube H 602 is encoded into two cubes of range, azimuth, and elevation angles. One cube represents intensity or brightness levels of reflections from targets (604), and another cube represents velocity information (606). Both cubes are a way to extract relevant information from the 4D radar data set and reduce its size for processing. A point cloud can then be formed from the relevant data in the cubes, i.e., from the data corresponding to targets of interest.

In another example, the hypercube H can be encoded by implementing an autoencoder 608 or other such neural network on the velocity information. Autoencoder 608 is a feed-forward neural network that is capable of reconstructing an input at the output under certain constraints. Autoencoders directly learn features from unlabeled data in an unsupervised mode (i.e., by first encoding and then decoding inputs). Using autoencoder 608 in the data pre-processing module 112 improves the performance of the target identification and decision module 114 and reduces its computational cost. Autoencoder 608 can also be used for information other than velocity, such as azimuth and elevation data.

Note that the point cloud generated from hypercube H 602 still encodes more data than traditional point clouds, such as those used in lidars. A lidar point cloud has data tuples of the form (x, y, z, B), where x, y, and z, are distance coordinates, and B represents the intensity or brightness at those coordinates. In contrast, the point cloud that is encoded from hypercube H 602 may be thought of as a point cloud with tuples of the form (x, y, z, $\vec{B}$), where $\vec{B}$ is a vector encoding brightness, velocity and angular information. It is appreciated that the data encodings illustrated in FIGS. 5-6 are example data encodings; other data encodings may be implemented to generate a point cloud from a hypercube containing 4D radar data.

Once the point cloud is generated, the data may be further pre-processed to correct for Non-Line-of-Sight ("NLOS") information. A point cloud obtained by a radar may include targets in the direct view or Line-of-Sight ("LOS") of the radar, NLOS targets that are "around the corners" or hidden from view from the radar, or NLOS reflections of LOS targets due to multi-path propagation of RF waves. The NLOS reflections are not actual targets, but rather, they represent an illusion due to reflected waves off of the actual target returning on a path different than a direct LOS path. Such illusions may make it difficult to accurately detect an actual target like another vehicle, a pedestrian and so on, and decrease the reliability of radars in autonomous driving applications by increasing the probability of false alarm.

Figure 7:
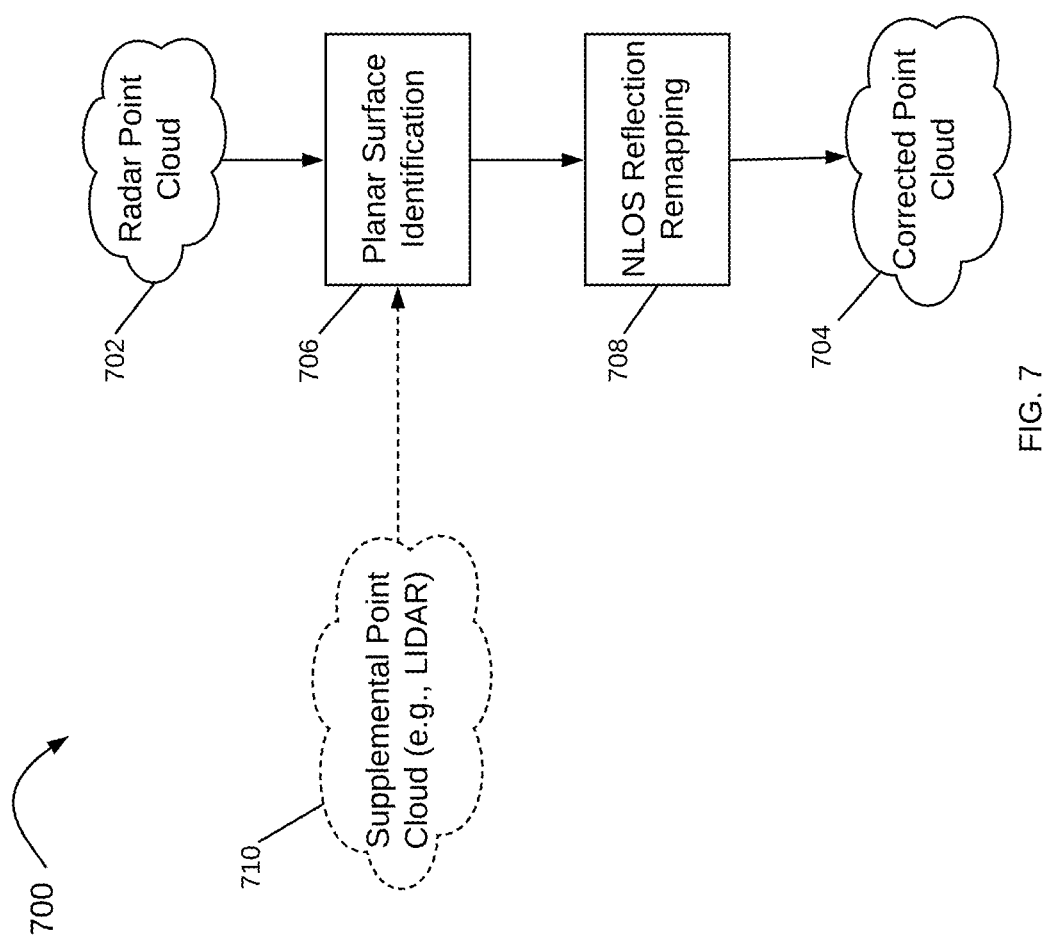
FIG. 7 is a schematic diagram of a NLOS correction module for use in a data pre-processing module in an iMTM radar in accordance with various examples.

Attention is now directed to FIG. 7, which illustrates a schematic diagram of a NLOS correction module for use in a data pre-processing module (e.g., data pre-processing module 112) in an iMTM radar in accordance with various examples. NLOS correction module 700 receives a radar point cloud 702 (i.e., a point cloud encoded from a radar hypercube such as illustrated in FIGS. 4-6) and generates a corrected point cloud 704 to properly account for NLOS reflections of actual LOS targets and provide an accurate localization of NLOS targets. NLOS correction module 700 has in essence two tasks to perform: for all points in a point cloud S, $s_i \in S$, (1) is $s_i$ the result of a reflection from a planar reflecting surface? (2) If so, where is the true location of the target corresponding to $s_i$?

The first task is performed by Planar Surface Identification Module 706, which locates all significant planar reflecting surfaces in the field of view of the radar system incorporating NLOS correction module 700. Once the plane reflecting surfaces are located, the second task is performed by NLOS Reflection Remapping Module 708, which remaps the NLOS reflections of a target about the identified planar reflecting surfaces to determine a best estimate of its true location.

Note that the Planar Surface Identification Module 706 may also receive a supplemental point cloud 710, e.g., a lidar point cloud, to aid in the identification of the planar reflecting surfaces. The Planar Surface Identification Module 706 may, for example, identify the planar reflecting surfaces in the supplemental point cloud 710 and then remap the NLOS reflections in NLOS Reflection Remapping Module 708 in the radar point cloud 702. Alternatively, the identification of the planar reflecting surfaces may be performed with the radar point cloud 702 using the supplemental point cloud 710 to verify that the planar reflecting surfaces were located correctly. The vice-versa scenario may also be used, with the supplemental point cloud 710 providing the data for the identification and the radar point cloud 702 providing the data to confirm that the identification is correct. Further, the identification may be performed in both of point clouds 702 and 710 and the results may be compared to determine the planar reflecting surface locations. It is appreciated that a number of point clouds may be used in this identification of planar reflecting surfaces by Planar Surface Identification Module 706. The NLOS Reflection Remapping Module 708 remaps the NLOS reflections about the identified planar reflecting surfaces using the radar point cloud 702.

Figure 8:
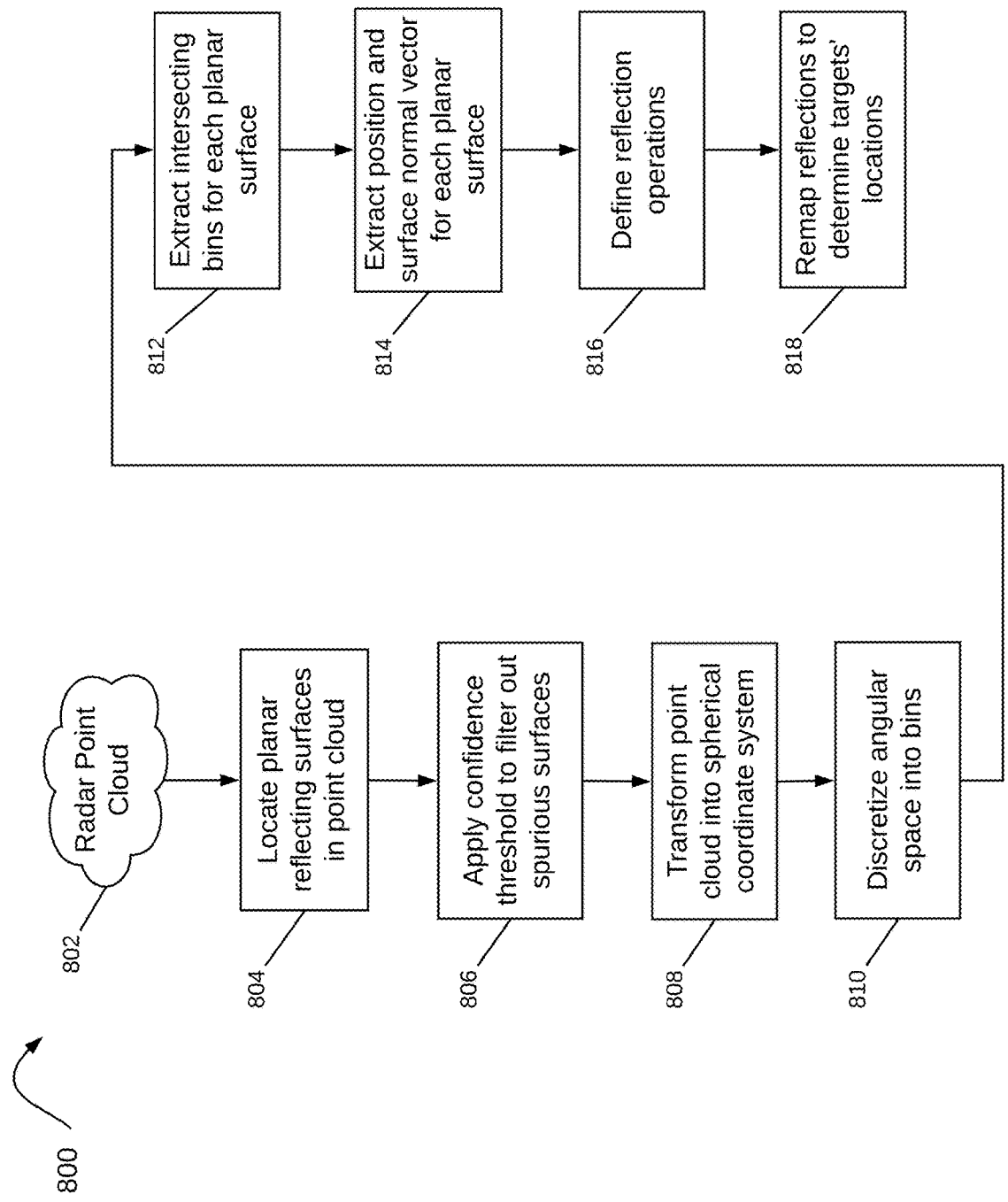
FIG. 8 is a flowchart illustrating the operation of the NLOS correction module of FIG. 6.

FIG. 8 illustrates the operation of the NLOS correction module of FIG. 7 in more detail. NLOS correction module 700 starts out by applying the Planar Identification Module 706 to a point cloud S (804). The point cloud may be a radar point cloud such as radar point cloud 802 or a supplemental point cloud. Alternatively, both point clouds may be used to generate two results that are compared. In various examples, Planar Surface Identification Module 706 implements a 3D Kernel-Based Hough Transform ("3DKHT") to detect the planar reflecting surfaces from the point cloud. The result of the 3DKHT application to a point cloud S is a list of L candidate planar surfaces with corresponding locations, orientations, and confidence estimates.

Candidate planar surfaces are compared to a confidence brightness threshold to indicate when there truly is a significant planar surface in the field of view. The spurious surfaces, i.e., candidate surfaces that are below the confidence brightness threshold, are then discarded (806). In general, the cost for false negative results (failing to predict a planar reflecting surface when in fact one exists) is much lower than the cost for false positives (predicting a reflection where none exists). Due to the high cost of false positives, it is likely that the confidence brightness threshold may be set high.

With the planar reflecting surfaces now identified, the point cloud S is transformed into a spherical coordinate system centered on the radar itself (808). The angular space of the point cloud S, i.e., the azimuth and elevation angles ($\phi,\theta$), is discretized into $k^2$ bins (810). For each of the L planar surfaces, NLOS correction module 700 proceeds to extract the bins that the planar surface intersects (812). The planar surface's position and its surface normal vector are also extracted (814). If two planar surfaces intersect the same bin, the more distant surface is ignored. For discussion and illustration purposes, consider that the L planar surfaces intersect M bins. The surface positions of the identified L planar surfaces in each bin intersection and their surface normal vector define M different reflection operations about the relevant surfaces (816). For each affected bin, the coordinates of the points in S whose distance from the radar exceeds the distance from the radar to the intersecting plane are then remapped by a reflection about the intersecting plane to locate the targets (818).

Note that this reflection operation can be defined in O(1) for each bin and performed in O(n) where n is the number of points to be reflected. Since each bin is expected to have on average $N/k^2$ points, and $M \alpha L k^2$, the entire reflection operation is expected to scale as $$\frac{LMN}{k^2} \cong LN.$$

If the confidence brightness threshold is kept high, there will not be an enormous number of planar surfaces, and so this scaling will be fine. Note also that the 3DKHT implementation for the Planar Surface Identification Module 706 is a deterministic method of planar Hough transformation which runs in N log N. The 3DKHT implementation has low enough computational and memory cost to be feasible on inexpensive hardware in real time. It is appreciated that other implementations for identifying planar reflecting surfaces may also be used by Planar Surface Identification Module 706.

It is also appreciated that there may a fair amount of trial and error in determining the proper confidence brightness threshold. One approach is to simplify the planar identification by looking first for horizontal planes. Further accuracy can be obtained by filtering out points due to targets with a non-zero velocity relative to a road, since they definitely do not correspond to a fixed planar surface. Such implementation may be used for example to image the back of a vehicle two places ahead of the autonomous driving vehicle in a line of cars, or image vehicles moving behind a line of stopped cars.

Figure 9:
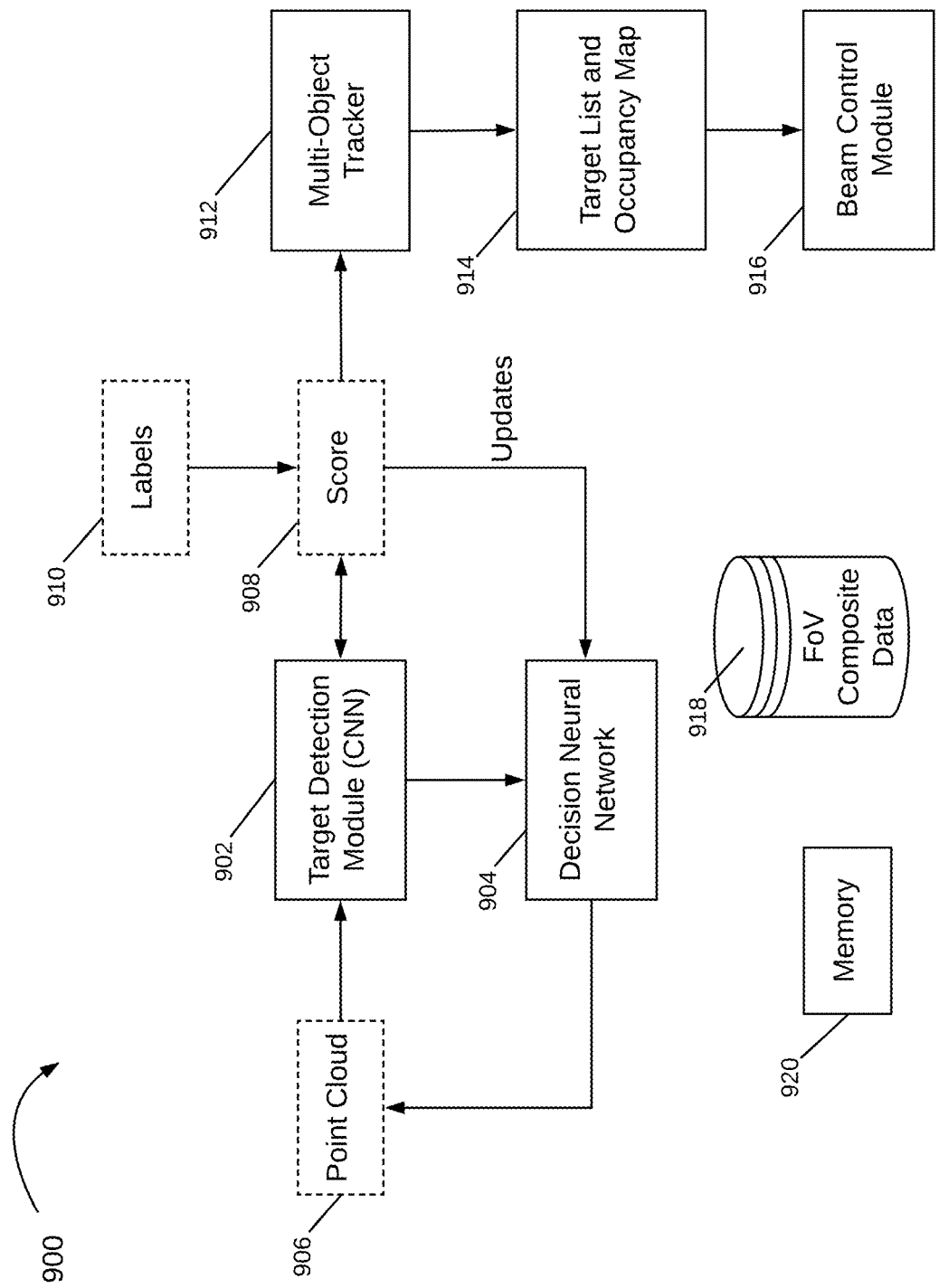
FIG. 9 is a schematic diagram of an iMTM interface module of FIG. 1 in accordance with various examples.

After the data is pre-processed to encode it into a point cloud and generate a NLOS-corrected point cloud, the NLOS-corrected point cloud is input into the iMTM interface module 104 for target detection and identification. Attention is now directed to FIG. 9, which shows a schematic diagram of an iMTM interface module of FIG. 1 in accordance with various examples. iMTM interface module 900 has two neural networks: a deep convolutional neural network ("CNN") in target detection module 902 and a decision network 904. CNN 902 takes in the NLOS-corrected point cloud 906 and provides output data detecting targets, identifying them (e.g., whether a vehicle, pedestrian, cyclist, wall, etc.), their location, velocity, and other identifying information. Decision network 904 is a Q-learning network that receives the output data from CNN 902 and determines an action for the iMTM antenna module 102 to perform, such as, for example, to steer RF beams to a given direction in the field of view.

In various examples, CNN 902 is a fully convolutional neural network ("FCN") with three stacked convolutional layers from input to output (additional layers may also be included in CNN 902). Each of these layers also performs the rectified linear activation function and batch normalization as a substitute for traditional L2 regularization and includes three filters. As a preliminary step to processing the point cloud 906, point cloud 906 is run through a dynamic threshold. Doing so encodes much higher resolution radar data while still retaining computational efficiency. Targets are shown in the point cloud 906 as voxels, which are values in the multi-dimensional space of the radar data containing range, velocity, azimuth and elevation angles.

The CNN 902 uses small regions of a visual field and identifies edges and orientations in the field, much like a filter for an image. The image goes through a series of convolutional, nonlinear sampling through layers, resulting in a probability. The layers include a convolutional layer that looks at these small regions individually, referred to as receptive fields. The filter process incorporates weights in connections between layers, and when the original information is passed through this layer, the result is a reduced set of data, referred to as a feature map. The feature map identifies targets detected in each receptive field. Note that there may be any number of feature maps as a function of features used in processing. The layers of the CNN 902 detect a first level of features, such as edges. The output of each layer feeds the next layer, which detects a second level of feature, such as a square. At the output of each layer in CNN 902 is a feature map identifying the locations of those features. And as data processes through CNN 902, the layers become more complex to further refine the specific target until the target can be properly identified (e.g., as a pedestrian, cyclist, animal, wall, vehicle, etc.). The final layer of the CNN 902 is a fully connected layer that takes an input feature map and outputs an N-dimensional vector, where N is the number of features or classes. Each number of the N-dimensional vector identifies the probability of each corresponding feature.

It is noted that CNN 902 may incorporate other information to help it identify targets in the vehicle's path and surrounding environment. For example, when a target is moving slowly and outside of a road line, it is likely that the target may be a pedestrian, animal, cyclist, and so on. Similarly, when a target is moving at a high speed, but lower than the average speed of other vehicles on a highway, CNN 902 may use this information to determine if the target is a bus or a truck, which tend in general to move more slowly. The location of a target, such as in the far-right lane of a highway, may also provide an indication as to whether the target may be a slower-moving type of vehicle. If the movement of the target does not follow the path of a road, then the target may be an animal, such as a deer crossing the road. All of this information may be determined from a variety of sensors and other information available to the vehicle, including information provided from weather and traffic services, other vehicles or the environment itself, such as smart roads and smart traffic signals. A sensor fusion module (described below with reference to FIG. 12) analyzes all the information available from the sensors to more accurately detect and identify each target.

Figure 10:
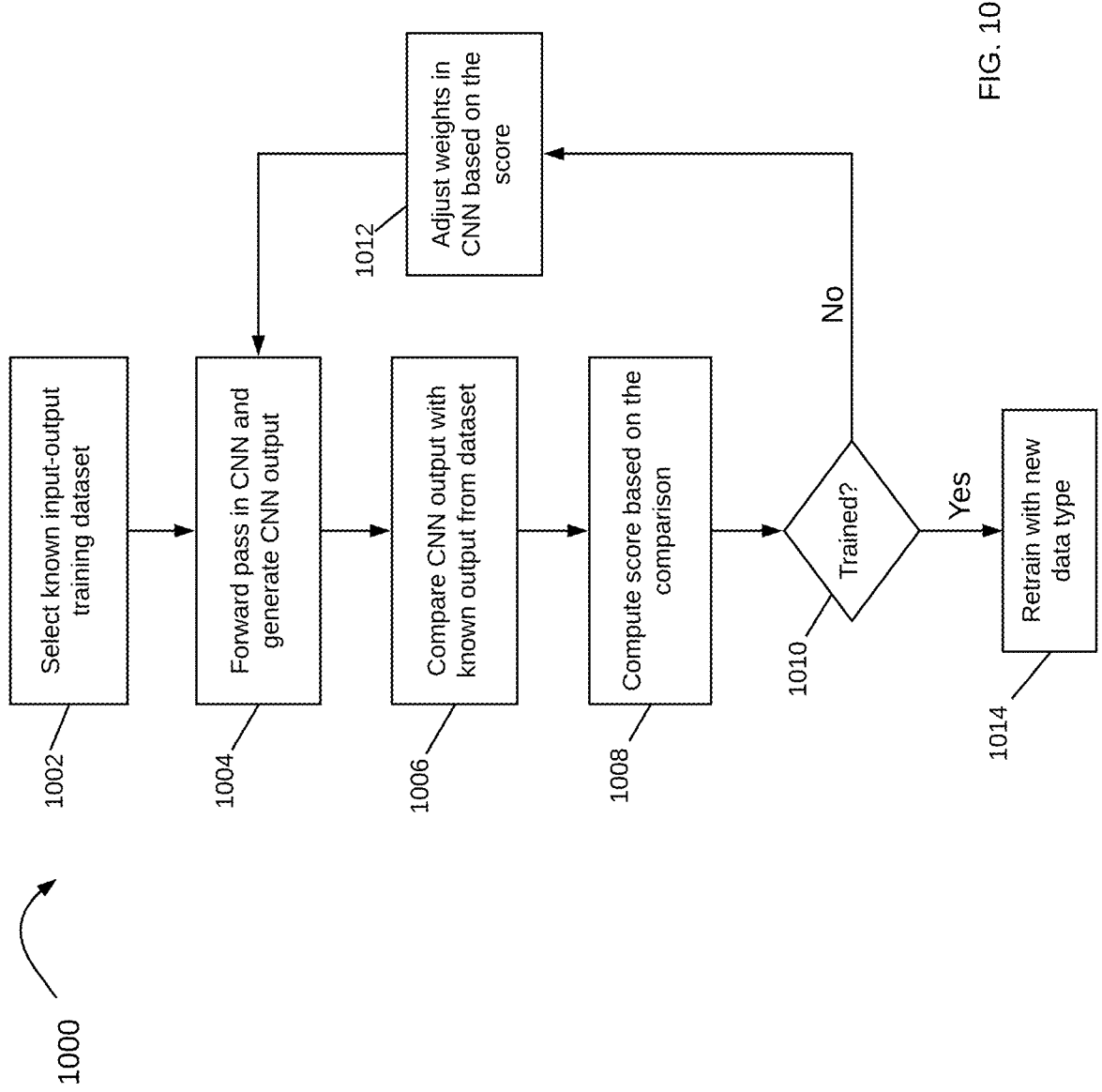
FIG. 10 is a flowchart illustrating the steps for training the CNN in the target detection module of FIG. 9.

The operational accuracy of the CNN 902 is determined by several factors, and one is the training process that provides feedback to the network to adjust its weights; this process is called backpropagation. A flowchart illustrating the steps for training the CNN 902 is shown in FIG. 10. The CNN 902 trains on known sets of input-to-output data. For example, an input may be the camera data received from a camera sensor at a time ti. The known input-output dataset is selected as either raw data or may be synthetic data; the data is digitized, and specific parameters extracted (1002). The data may also be compressed or pre-processed. Either way, there is a set of input data received from a sensor (e.g., iMTM antenna module 102). The CNN 902 does a forward pass through each one of its layers, computing each layer output based on the weights in the layer, and passing the output to the next layer (1004). The output data of CNN 902 is then what information you would like the CNN 902 to provide you when it receives this set of sensor data, i.e., the output of CNN 902 will be in the same form as the known output of the selected data. Its value, however, may differ from the known output. The next step is to compare the output of CNN 902 with the known, expected output from the selected dataset (1006). This can be implemented in a number of ways, such as by Euclidean distance, cross entropy, weighted cross entropy, and other such measures.

A score 908 is determined as an indication of how close the output of CNN 902 matches the expected output (1008). Steps 1004-1008 iterate until the scores indicate that the network is trained (1010), that is, until an error tolerance for the scores is small enough and the outputs of CNN 902 given the known inputs are within a desired tolerance from the known outputs. If they are not, then the score 908 is sent back to the CNN 902 to adjust its weight (1012) and steps 1004-1008 continue to iterate. Training of CNN 902 is therefore an iterative process, which terminates when the output of the network is sufficiently close to the desired results. There are a variety of methods to adjust the weights in the CNN 902; the goal is to have a CNN 902 that can receive any sensor information (e.g., point cloud 906) and predict the targets and environment as closely as possible.

In various examples, the CNN 902 may be trained on one type of data (e.g., lidar point cloud data, radar synthetic data, etc.) and then retrained (1014) to adapt to a new set of data (e.g., radar data). Retraining may be done using a combination of synthesized data and real sensor data. Real sensor data may be labeled with labels 910, which are, for example, bounding boxes placed around known items in view in each multi-dimensional slice of the radar data. Note that labels 910 for training CNN 902 may not be necessary, such as when an autoencoder 606 is used in the data pre-processing module 112.

As shown in FIG. 9 and described above, the output of CNN 902 is sent to DNN 904 so that DNN 904 can determine an action for the iMTM antenna module 102 to perform, such as, for example, to steer RF beams to a given direction in the FoV. In order to select the best action, DNN 904 is trained based on reinforcement learning, a machine learning technique inspired by behavioral psychology. The idea is to have DNN 904 choose an action for a given state such that its reward is maximized. In this case, the state is the output of the CNN 902, the action is a selection of beam parameters for the iMTM antenna module 102 to know where to direct its next beams with the selected parameters (e.g., beam width, direction, etc.), and the reward is the performance of the DNN 904 following the selections.

Training the DNN 904 boils down to indicating to the DNN 904 when it is doing well and when it is doing poorly. For example, reinforcement learning is used to train dogs. You cannot tell the dog what to do, but over time the dog will understand that certain actions lead to more rewards. The rewards are also not the same; some rewards may be more likely or desirable than others. The goal of DNN 904 is then to maximize its expected future reward of an action given a state. Training of DNN 904 is accomplished by teaching the DNN 904 to have the optimal representation of the space of states, actions, and rewards.

Figure 11:
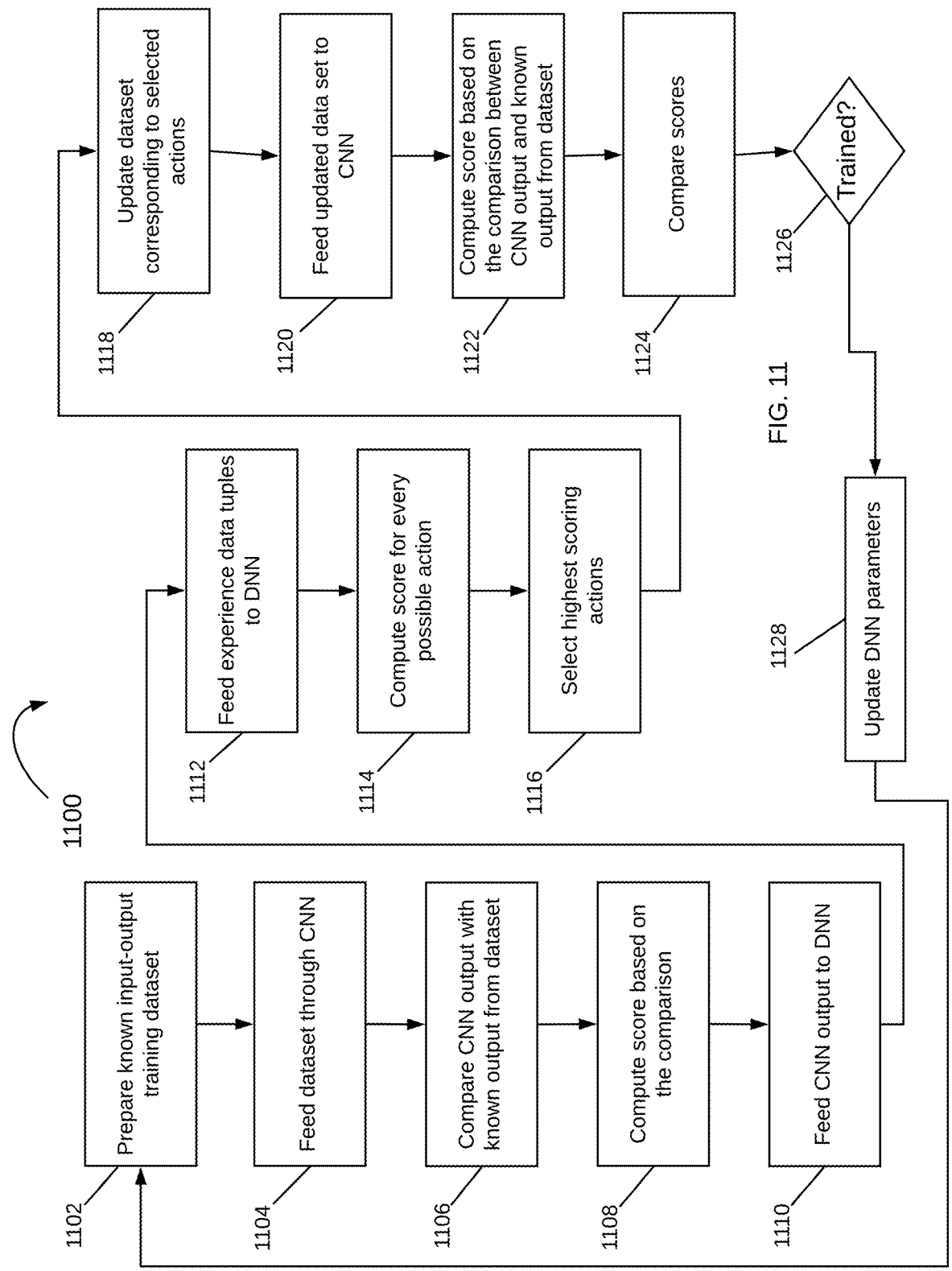
FIG. 11 is a flowchart for training the DNN of the iMTM interface module shown in FIG. 9.

Attention is now directed to FIG. 11, which illustrates a flowchart for training the DNN 904 of FIG. 9. The first step in training 1100 is to prepare a known input-output training dataset (1102). The dataset can include synthetic and/or real data output by a radar system such as the iMTM radar system 100 of FIG. 1. As described above, the data from these radar systems is multi-dimensional and includes measures such as range, velocity, azimuth and elevation for each beam. In training DNN 904, a full 4D data set can be used, or alternatively, DNN 904 may be trained with a smaller dimensional set. In one example, the dataset used in training is a 4D hybercube; in other examples, a 3D data cube is used by scanning data at a fixed elevation (e.g., zero or other elevation) and recording the range, velocity and azimuth angles.

Let this dataset be represented by a cube or hypercube denoted by M. In each orientation of a beam, a sequence of pulses is collected to contain sufficient information to fill one slice of M. This dataset may be referred to as the "raw data cube," as it contains information which may be preprocessed, but has not yet been fed to any machine learning components. Out of this dataset, a set of k directions is selected. The selection may be performed randomly or in other ways. Each of the k directions is associated with known outputs. That is, the dataset may be prepared by generating beams in the radar system in the k directions in a road-like environment, recording the reflections from known targets, and labeling the data with bounding boxes around the targets so that each target's location and type (e.g., vehicle, wall, pedestrian, animal, cyclist, etc.) is known. Alternatively, the dataset may contain a set of known input-output pairs representing a real-world scenario of a vehicle in a road.

The raw data cube containing data corresponding to these k directions is then fed through the CNN 902 (1104). The output of CNN 902, which may have already been trained, is compared with the known output from the selected dataset (1106). A score is computed based on the comparison (1108). In various examples, a single score may be computed for each direction; in other examples, a composite score may be computed for the k directions. The output of the CNN 902 is input into the DNN 904 (1110). The DNN 904 also has a set of experience data tuples of (state, action, reward, next-state) (1112). The state, as described above, corresponds to the output of the CNN 902, the action corresponds to a selected set of beam parameters, and the reward is a desired performance measure following the selections. In various examples, the reward may be a function such as:

$$r \propto \ln\left(\frac{\text{loss}_i}{\text{loss}_{i-1}}\right) \quad \text{(Eq. 1)}$$

where loss may be a measure such as Euclidean distance, weighted binary cross entropy, or another such measure. Note that loss is not used directly, so as not to punish good actions taken in bad situations and vice-versa.

During training, DNN 904 is run to explore the action space with a fixed probability of taking random actions. Each experience data tuple is then recorded as it's encountered and stored in a buffer of fixed length (e.g., of a length of $10^5$). DNN 904 is trained by sampling mini-batches randomly from this buffer and computing a state-action Q function known in Q-learning as the Bellman equation:

$$Q(s,a) = r + \gamma \max_{a'} Q(s',a') \quad \text{(Eq. 2)}$$

where $\gamma$ is a discount rate for the rewards between 0 and 1 to take into account the fact that not all rewards are the same: the larger the value of $\gamma$, the smaller the discount (i.e., DNN 904 cares more about the long-term reward), and the smaller the $\gamma$, the bigger the discount (i.e., DNN 904 cares more about the short-term reward). Conceptually, Eq. 2 states that the maximum future reward for state s and action a is the immediate reward r plus the maximum future reward for the next state. The Q function may be implemented as the buffer, with states as rows and actions as columns. In various examples, for computing the maximum future reward for the next state (i.e., $\gamma \max_{a'} Q(s',a')$), previous, frozen versions of DNN 904 are used to avoid instabilities and oscillations during training. Furthermore, because DNN 904 is expected to require less forward planning than many Q-learning applications, the discount rate $\gamma$ is initially set to 0 and gradually increased during training. This technique helps the network converge more rapidly and has not been introduced in the Q-learning literature.

Based on Eqs. 1-2, DNN 904 computes a score for every possible action (1114). In deterministic operation, the k highest scoring options are selected (1116) and the dataset is updated with data corresponding to the selected actions (1118). The updated data set is fed to the CNN 902 (1120), which once again produces a score based on the comparison between the output of CNN 902 and the known, expected output from the dataset (1122). This score is compared to the previous score, and based on this comparison, it is determined that the k selections made by DNN 904 were either good or bad (1124). Depending on this determination, DNN 904 may be considered to be trained (1126), but if not, its parameters are updated (1128), and training continues with further data.

It is appreciated that while the operation of DNN 904 may occur at a framerate that may require selecting more than one beam at a time, during training the space of actions may be restricted to the selection of a single beam. This is because it is desired to attribute a change in score to a particular action, rather than an average score to a group of actions. To match the framerate goals, the simulated world is frozen for k steps before advancing, so that the effect is to select k beams during each timestep as will be done during inference with DNN 904.

It is also appreciated that an additional training mode may be enabled: alternate or simultaneous training of DNN 904 and CNN 902. Alternatively, CNN 902 and DNN 904 may be first trained with one type of data (e.g., lidar data) and retrained with radar data. The networks CNN 902 and DNN 904 may also be trained with real, labelled data in a real-world subsampling scenario. In this case, rather than being able to choose any of the possible actions, the action space may be restricted to the subset of actions that were actually taken. Having selected one of these actions, training proceeds as before. If done entirely asynchronously, this constitutes an "off-policy" approach. However, this process may be iterated a number of times, where each new dataset is collected using the latest policy network. Note that when an autoencoder such as autoencoder 606 of FIG. 6 is used to pre-process the radar data prior to it being fed through CNN 902 and DNN 904, the training process is improved—both in its performance and computational complexity.

Returning to FIG. 9, the output of the CNN 902 and DNN 904 is fed through a multi-object tracker 912 to track the identified targets over time, such as, for example, with the use of a Kalman filter. Information on identified targets over time are stored at a target list and occupancy map 914, which keeps tracks of targets' locations and their movement over time as determined by the multi-object tracker 912. The tracking information provided by the multi-object tracker 912 and the micro-doppler signal provided by the micro-doppler module 116 of FIG. 1 are combined to produce an output containing the type of target identified, their location, their velocity, and so on.

The beam control module 916 receives the output from the target list and occupancy map 914 and determines the adjustments, if any, to be made. In some examples, the iMTM radar 100 scan begins with a coarse scan having a large bandwidth. On target detection, the beam width narrows. The beam control module 916 may vary the beam width as quickly or slowly as desired. In some examples, the beam width is a binary value, and in others it may take on continuous values. The beam control module 916 also instructs the iMTM antenna module 102 where to direct the next beam, such as from a specific subarray or subarrays. The beam control module 916 also determines parameters and dimensions of the next beams for iMTM antenna module 102. In various examples, the iMTM interface module 900 also includes FoV composite data 918 and memory 920. FoV composite data 918 stores information that describes a FoV and memory 920 stores useful data for the iMTM radar system, such as, for example, information on which subarrays of the iMTM antenna structure perform better under different conditions. The beam control module 916 may use the FoV information stored in FoV composite data 918 and the subarray information stored in memory 920 to better control the parameters of the next beams.

Figure 12:
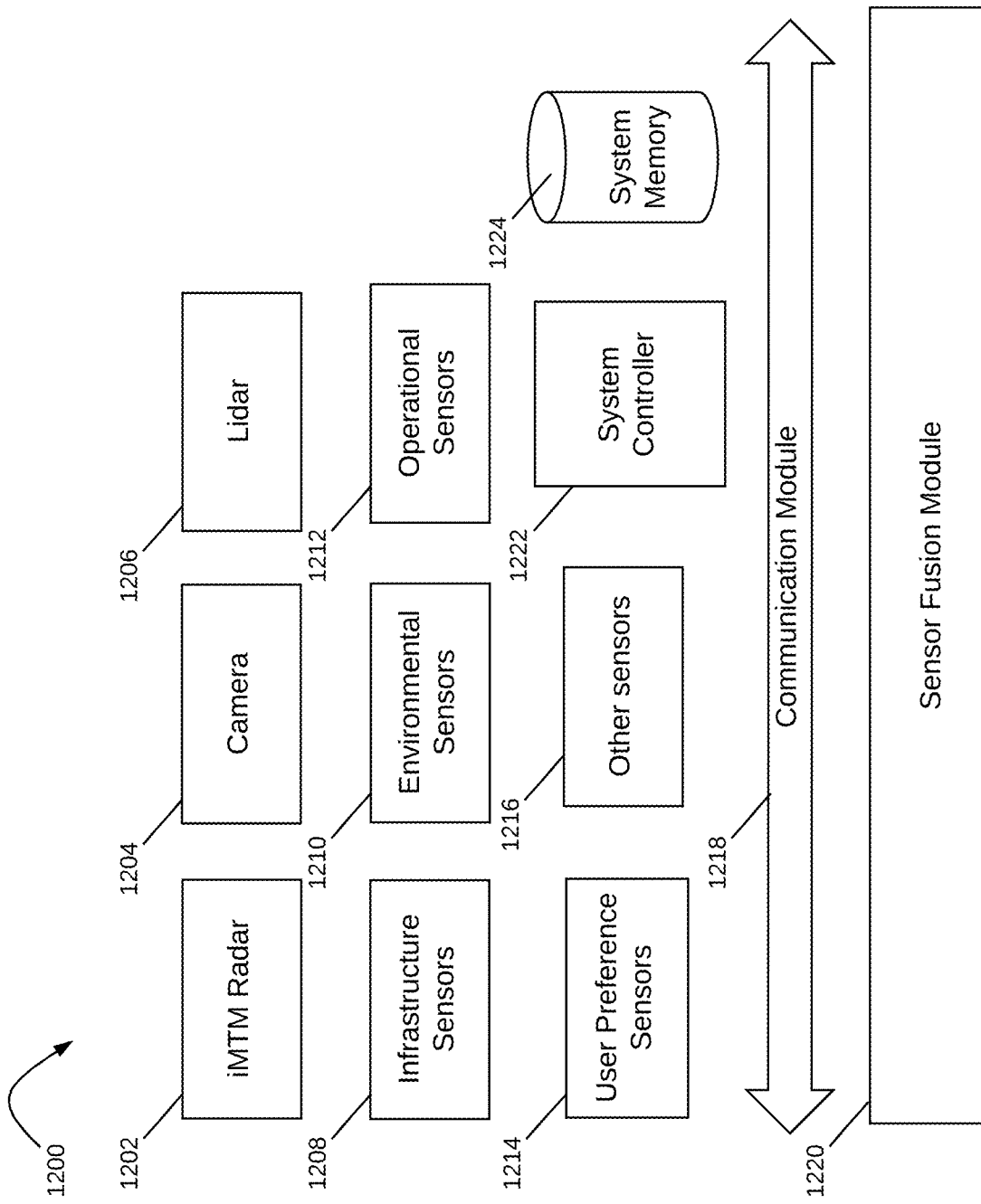
FIG. 12 is a schematic diagram of an autonomous driving system having an iMTM radar in accordance with various examples.

The target identification information from iMTM radar system 100 is sent to a sensor fusion module, where it is processed together with target detection and identification from other sensors in the vehicle. FIG. 12 illustrates a schematic diagram of an autonomous driving system having an iMTM radar in accordance with various examples. Autonomous driving system 1200 is a system for use in a vehicle that provides some or full automation of driving functions. The driving functions may include, for example, steering, accelerating, braking, and monitoring the surrounding environment and driving conditions to respond to events, such as changing lanes or speed when needed to avoid traffic, crossing pedestrians, animals, and so on. The autonomous driving system 1200 includes an iMTM radar 1202 and other sensor systems such as camera 1204, lidar 1206, infrastructure sensors 1208, environmental sensors 1210, operational sensors 1212, user preference sensors 1214, and other sensors 1216. Autonomous driving system 1200 also includes a communications module 1218, a sensor fusion module 1220, a system controller 1222 and a system memory 1224. It is appreciated that this configuration of autonomous driving system 1200 is an example configuration and not meant to be limiting to the specific structure illustrated in FIG. 12. Additional systems and modules not shown in FIG. 12 may be included in autonomous driving system 1200.

iMTM radar 1202 includes an iMTM antenna module (e.g., iMTM antenna module 102) for providing dynamically controllable and steerable beams that can focus on one or multiple portions of a 360° FoV of the vehicle. The beams radiated from the iMTM antenna module are reflected back from targets in the vehicle's path and surrounding environment and received and processed by the iMTM radar 1202 to detect and identify the targets. The iMTM radar 1202 also has an iMTM interface module (e.g., iMTM interface module 104 of FIG. 1) that is trained to detect and identify targets and control the iMTM antenna module as desired.

Camera sensor 1204 may be used to detect visible targets and conditions and to assist in the performance of various functions. The lidar sensor 1206 can also be used to detect targets outside the vehicle and provide this information to adjust control of the vehicle. This information may include information such as congestion on a highway, road conditions, and other conditions that would impact the sensors, actions or operations of the vehicle. Camera sensors are currently used in ADAS systems to assist drivers in driving functions such as parking (e.g., in rear view cameras). Cameras are able to capture texture, color and contrast information at a high level of detail, but similar to the human eye, they are susceptible to adverse weather conditions and variations in lighting. Lidar sensors measure the distance to an object by calculating the time taken by a pulse of light to travel to an object and back to the sensor. When positioned on top of a vehicle, lidars are able to provide a 360° 3D view of the surrounding environment. However, lidar sensors are still prohibitively expensive, bulky in size, sensitive to weather conditions and are limited to short ranges (typically <200 m), with resolution decreasing with range. Radars, on the other hand, have been used in vehicles for many years and operate in all-weather conditions. Radars also use far less processing than the other types of sensors and have the advantage of detecting targets behind obstacles and determining the speed of moving targets.

Infrastructure sensors 1208 may provide information from infrastructure while driving, such as from a smart road configuration, bill board information, traffic alerts and indicators, including traffic lights, stop signs, traffic warnings, and so forth. This is a growing area, and the uses and capabilities derived from this information are immense. Environmental sensors 1210 detect various conditions outside, such as temperature, humidity, fog, visibility, precipitation, and so forth. Operational sensors 1212 provide information about the functional operation of the vehicle. This may be tire pressure, fuel levels, brake wear, and so forth. The user preference sensors 1214 may be configured to detect conditions that are part of a user preference. This may be temperature adjustments, smart window shading, and so forth. Other sensors 1216 may include additional sensors for monitoring conditions in and around the vehicle.

In various examples, the sensor fusion module 1220 optimizes these various functions to provide an approximately comprehensive view of the vehicle and environments. Many types of sensors may be controlled by the sensor fusion module 1220. These sensors may coordinate with each other to share information and consider the impact of one control action on another system. In one example, in a congested driving condition, a noise detection module (not shown) may identify that there are multiple radar signals that may interfere with the vehicle. This information may be used by the iMTM interface module in system 1200 to adjust the beam size of the iMTM antenna module so as to avoid these other signals and minimize interference.

In another example, environmental sensor 1210 may detect that the weather is changing, and visibility is decreasing. In this situation, the sensor fusion module 1220 may determine to configure the other sensors to improve the ability of the vehicle to navigate in these new conditions. The configuration may include turning off camera or laser sensors 1204-1206 or reducing the sampling rate of these visibility-based sensors. This effectively places reliance on the sensor(s) adapted for the current situation. In response, the iMTM interface module (e.g., iMTM interface module 104 of FIG. 1) configures the iMTM radar 1202 for these conditions as well. For example, the iMTM radar 1202 may reduce the beam width to provide a more focused beam, and thus a finer sensing capability.

In various examples, the sensor fusion module 1220 may send a direct control to the iMTM antenna module (e.g., iMTM antenna module 102) based on historical conditions and controls. The sensor fusion module 1220 may also use some of the sensors within system 1200 to act as feedback or calibration for the other sensors. In this way, an operational sensor 1212 may provide feedback to the iMTM interface module and/or the sensor fusion module 1220 to create templates, patterns and control scenarios. These are based on successful actions or may be based on poor results, where the sensor fusion module 1220 learns from past actions.

Data from sensors 1202-1216 may be combined in sensor fusion module 1220 to improve the target detection and identification performance of autonomous driving system 1200. Sensor fusion module 1220 may itself be controlled by system controller 1222, which may also interact with and control other modules and systems in the vehicle. For example, system controller 1222 may turn the different sensors 1202-1216 on and off as desired, or provide instructions to the vehicle to stop upon identifying a driving hazard (e.g., deer, pedestrian, cyclist, or another vehicle suddenly appearing in the vehicle's path, flying debris, etc.)

All modules and systems in autonomous driving system 1200 communicate with each other through communication module 1218. Autonomous driving system 1200 also includes system memory 1224, which may store information and data (e.g., static and dynamic data) used for operation of system 1200 and the vehicle using system 1200. Communication module 1218 may also be used for communication with other vehicles, referred to as V2V communication. V2V communications may include information from other vehicles that is invisible to the user, driver, or rider of the vehicle, and may help vehicles coordinate to avoid an accident.

Figure 13:
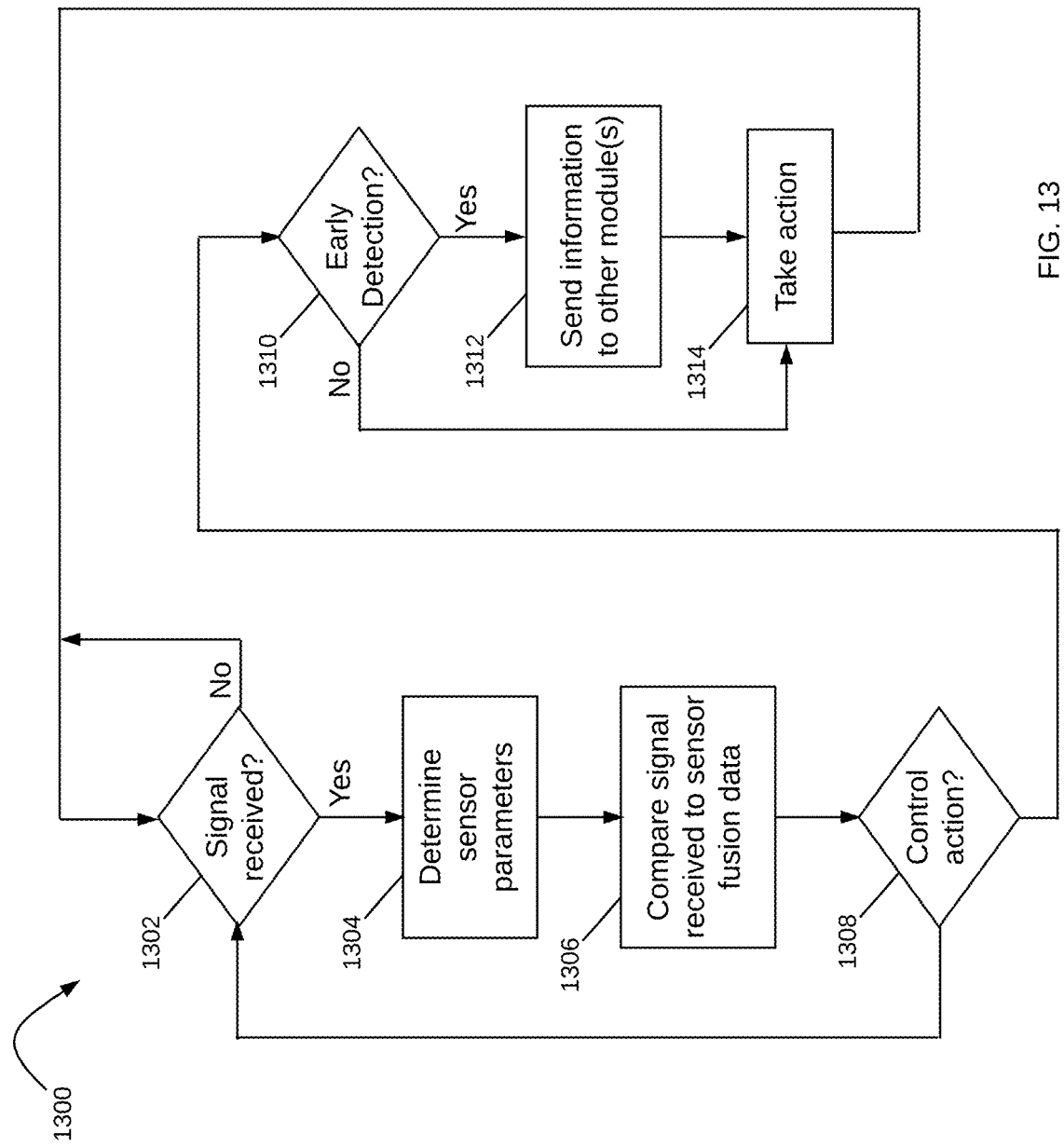
FIGS. 13-14 illustrate processes implemented in the sensor fusion module of FIG. 12.
Figure 14:
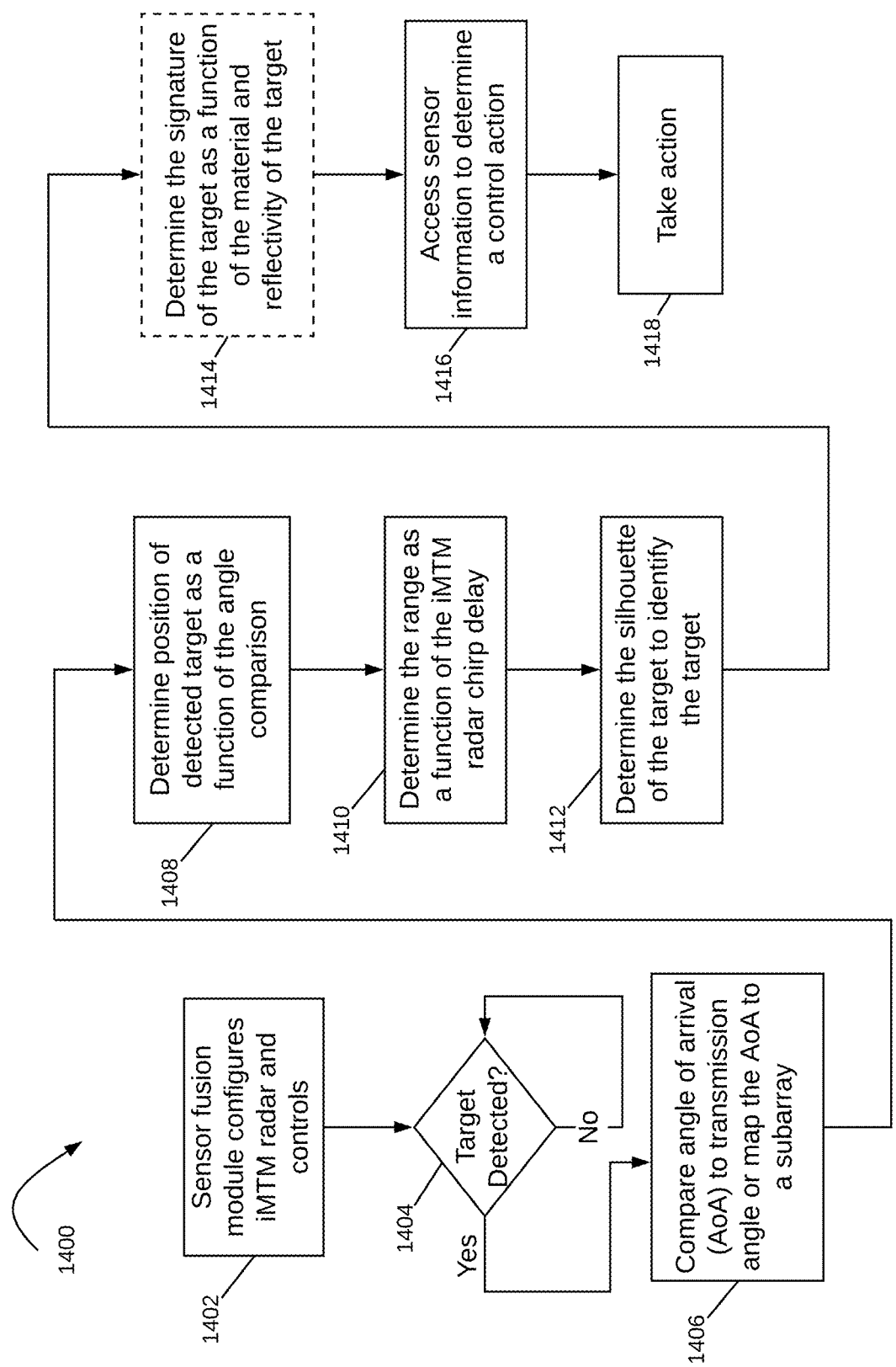

Attention is now directed to FIGS. 13-14, which illustrate processes implemented in the sensor fusion module 1220 of FIG. 12, and actions based on sensor readings. In FIG. 13, a process 1300 looks to see if a signal is received from any of the sensors within a system (1302), such as in sensor fusion module 1220 of FIG. 12. If no signal is received, processing continues to listen for sensor signals. When a signal is received (1302), the sensor fusion module 1220 determines the sensor parameters (1304), which include the information type received from the sensor. This information may be stored for analysis as to actions taken by the vehicle to enable intelligent, flexible, and dynamic control. The process 1300 then continues to compare the signal received to data stored by the sensor fusion module 1220 (1306) wherein such data may be stored in memory (not shown) or stored in a networked repository, such as a cloud database and system (not shown). At this point, if a control action is indicated at 1308, processing continues to determine if this control action and/or the information received from the sensor will provide early detection for this or another action. This early detection check (1310) allows the entire sensor ecosystem to take advantage of information from any of the sensors in the autonomous driving system 1200. If the sensor information may be used for early detection (1310) then the information is sent to one or more modules (1312), or is stored in memory as a data point in the current scenario. The autonomous driving system 1200 then takes the indicated action (1314) and returns to listen for signals at 1302. If the information is not used for early detection at 1310, then processing continues to take the indicated action at 1314. If no control action is indicated at 1308, processing returns to listen for sensor signals.

FIG. 14 illustrates another process 1400 according to some examples, wherein the sensor fusion module 1220 configures sensors and controls for operation at 1402. This may be a dynamic step or may be a persistent configuration. When a target is detected by the iMTM radar 1202 (1404), the process 1400 uses that information to calculate or determine specifics relating to the target with respect to the antenna position. The angle of arrival ("AoA") is compared to the transmission angle or is mapped to a subarray in the iMTM antenna structure in iMTM radar 1202 (1406). This information is used to determine the position of the detected target in 2D or 3D space (1408). The range, or distance from the antenna to the target, is a function of the radar chip delay (1410). The information from the iMTM radar 1202 and other sensors is used to determine a silhouette and/or footprint of the target (1412). Optionally, information from the sensor(s) may provide a target signature of the target (1414), depending on the target's composition (e.g., metal, human, animal) and so forth. This may be an indication of the reflectivity of the target. The target signature is a more detailed understanding of the target, which may give dimensions, weight, and so forth. Alternatively, the target may be identified as described above with the target identification and decision module 114 of FIG. 1. The sensor fusion module 1220 then accesses sensor information to determine a control action (1416) and instructs the vehicle to take action (1418).

A variety of information is determined from the iMTM radar 1202; such information may be a function of the modulation waveform and technique, the frequency, the chirp delay, the frequency change of the received signal and so forth. The specific radiation pattern used may be crafted to accomplish specific goals according to the application. The sensor fusion module 1220 enables such control to optimize the system and reduce the processing required. For example, the iMTM radar 1202 may be used to reduce the number of sensors and/or the active time of each sensor. In this way, some sensors may be disabled during certain conditions, and activated on a change in that condition.

The various examples described herein support autonomous driving with improved sensor performance, all-weather/all-condition detection, advanced decision-making algorithms and interaction with other sensors through sensor fusion. These configurations optimize the use of radar sensors, as radar is not inhibited by weather conditions in many applications, such as for self-driving cars. The ability to capture environmental information early aids control of a vehicle, allowing anticipation of hazards and changing conditions. Sensor performance is also enhanced with these structures, enabling long-range and short-range visibility. In an automotive application, short-range is considered within 30 meters of a vehicle, such as to detect a person in a cross walk directly in front of the vehicle; and long-range is considered to 250 meters or more, such as to detect approaching cars on a highway. These examples provide automotive radars capable of reconstructing the world around them and are effectively a radar "digital eye," having true 3D vision and capable of human-like interpretation of the world.

Figure 15:
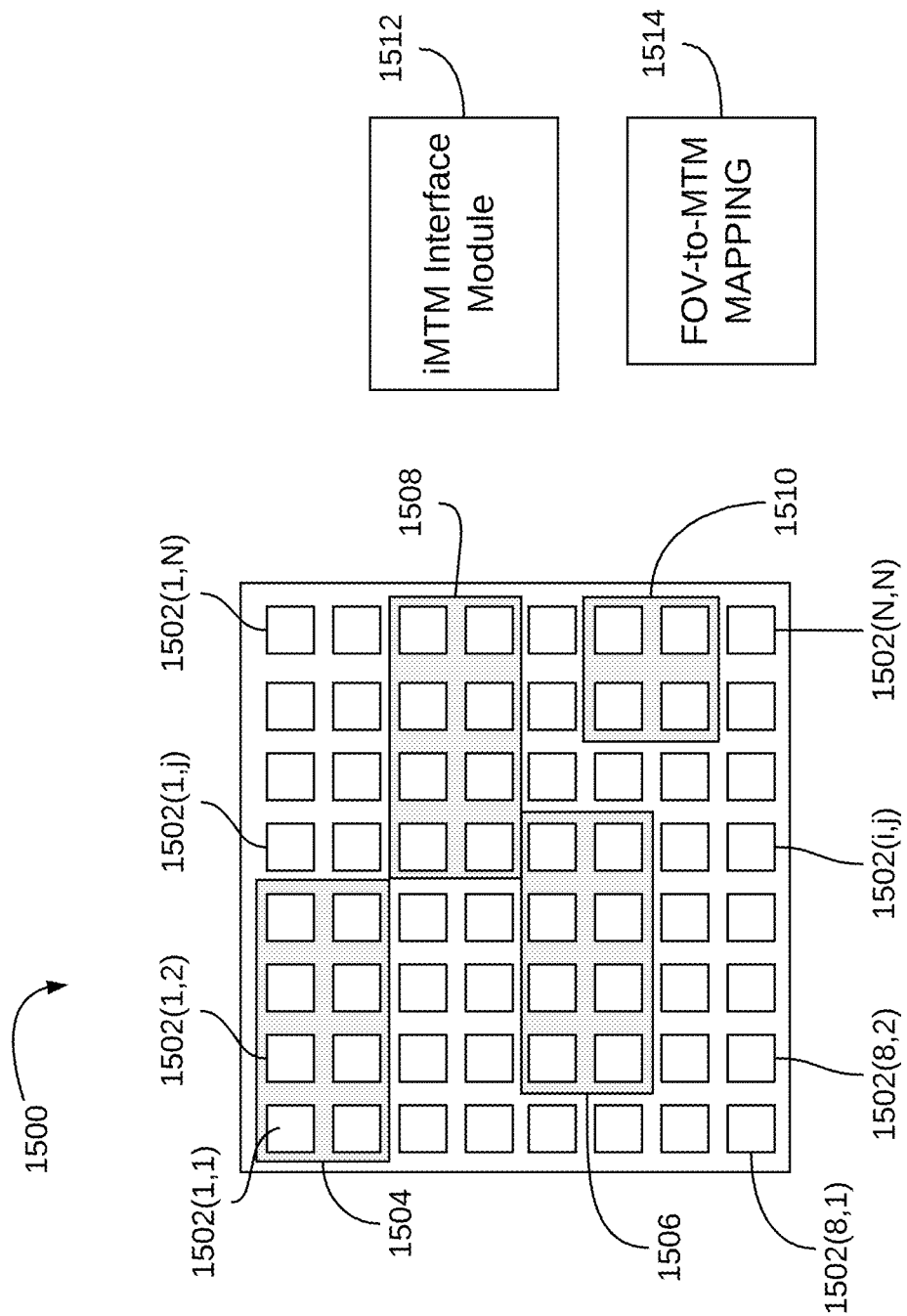
FIG. 15 is a schematic diagram of an example iMTM antenna structure in accordance with various examples.

These capabilities in a radar as iMTM radar 100 of FIG. 1 are enabled with the use of an iMTM antenna structure such as iMTM antenna structure 106 in iMTM antenna module 102. FIG. 15 illustrates an iMTM antenna structure 1500 (or a portion of a structure) having a plurality of iMTM cells arranged in an array of N×N unit cells, wherein for clarity and discussion herein each unit cell is identified by a row, column index (i,j). The array can be an asymmetric N×M array as well. For simplicity, a symmetric N×N case is described. For example, from the viewer's perspective, the unit cell in the upper corner is identified as 1502 (1,1); and the unit cell in the bottom right is identified as 1502 (N,N). Other configurations are possible based on the application, structure, physics and goals of the antenna structure 1500. Antenna structure 1500 is part of an antenna system or module, e.g., iMTM antenna module 102 of FIG. 1, that includes other modules, some of which are not shown in this drawing. Similarly, the specific shape of the unit cells may take on any of a variety of shapes that result in the characteristics and behavior of metamaterials and are not restricted to square or rectangular or any other regular shape.

Each of the unit cells 1502 (i,j) in the antenna structure 1500 may operate individually or as part of a subarray. As illustrated, the iMTM interface module 1512 (e.g., implemented like the iMTM interface module 104 of FIG. 1) has associated or grouped specific unit cells into sub-arrays 1504-1510. The iMTM interface module 1512 determines where the radiated beam is to be directed, the shape of the beam and the dimensions of the beam. The beam may be a coarse or large bandwidth beam, a midsized beam or a small, narrow bandwidth beam depending on the situation, the target detected and the timing of the detection, as well as other considerations. The iMTM interface module 1512 may preconfigure one or more of the subarrays to anticipate a next action, or may use a default configuration, such as to start with a broad bandwidth which enables a faster scan capability or sweep time. For each sweep, the FoV is divided into portions, which may have consistent dimensions, different dimensions or may be dynamically adjusted. In some examples, the iMTM interface module 1512 selects specific directions to have a narrow beam, such as directly in front of the vehicle; other directions, such as on the edges of the FoV may be scanned with a wide beam. These and other design considerations are made by the designer in setting up the iMTM interface module 1512, wherein some are flexible and configurable. In the illustrated example, the iMTM antenna structure 1500 has several subarrays that are intended to direct the beam and form the desired radiation pattern.

Once a target is detected and identified, the FoV-to-MTM mapping 1514 identifies the portion of the FoV for the iMTM interface module 1512 and maps that location to a specific iMTM unit cell or subarray that will focus on and capture more information about the target. In some examples, the iMTM interface module 1512 has access to various scenarios and may use detected information to predict future conditions on the road. For example, if the iMTM antenna structure 1500 detects a deer running across the road in an area having a known deer path, the iMTM interface module 1512 may predict the direction of the deer, as well as anticipate other deer that may follow. The radiation beams from antenna structure 1500 may sweep across the FoV, wherein the visual field of view and the antenna field of view are not necessarily the same. In this case, the antenna FoV may be a 2D view, whereas targets are typically 3D. Various systems and configurations enable 3D target detection and classification through placement of transmit and receive antenna arrays and or combinations of multiple transmit to multiple receive structures.

Figure 16:
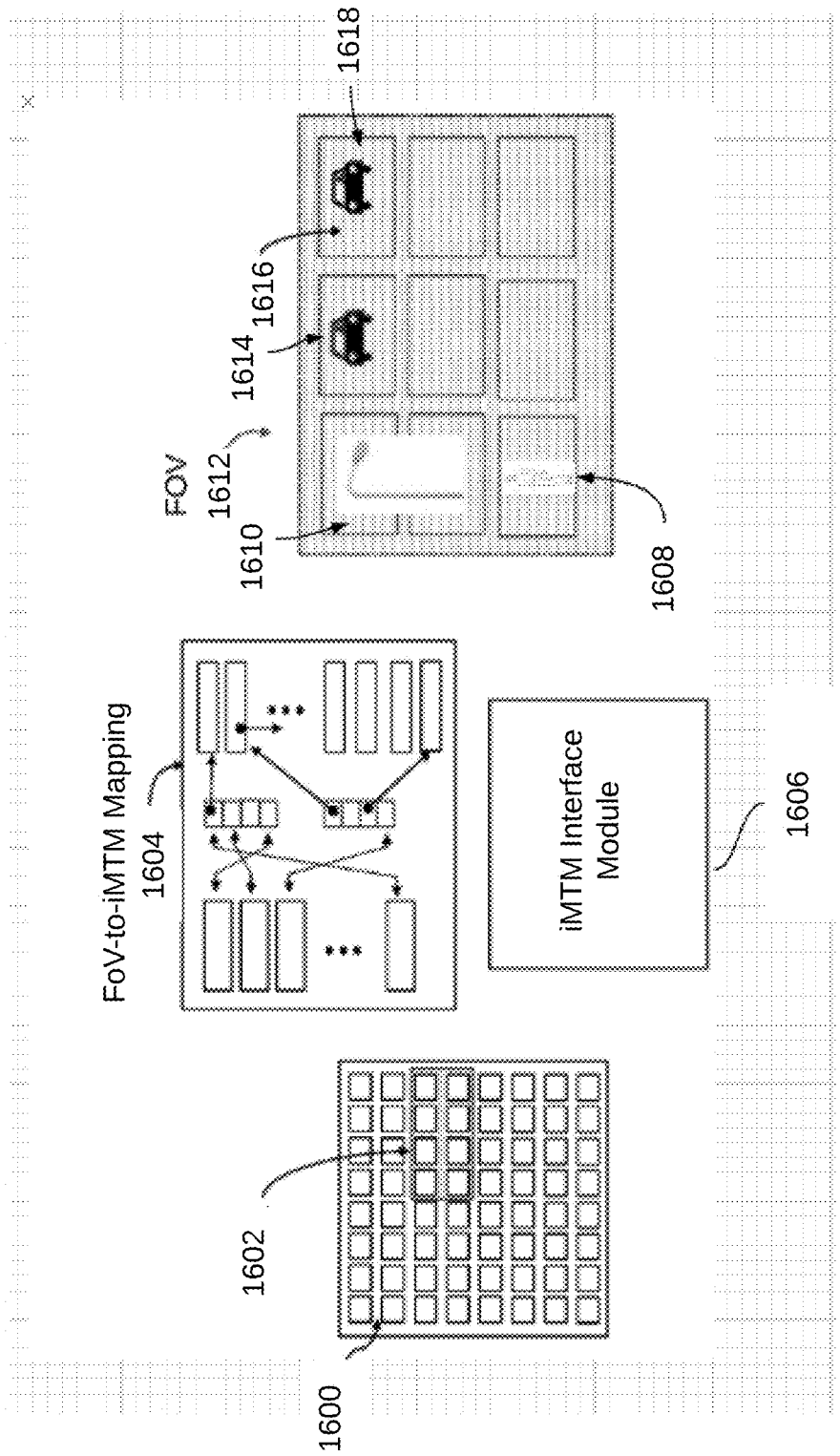
FIG. 16 illustrates an example iMTM antenna array for use in an iMTM antenna structure.

FIG. 16 illustrates an iMTM antenna array 1600 having at least one sub-array 1602 activated to generate beams to capture a specific area or FoV 1612, corresponding to the iMTM radar system 100 of FIG. 1. When the car 1618 is detected within an area 1616, the iMTM interface module 1606 identifies the associated portion 1616 of the FoV 1612. This is mapped to the portion of the iMTM antenna array 1600 that will generate a focused beam in that area; and that portion is sub-array 1602. Similarly, car 1614 is also identified within FoV 1612 in another area; street lamp 1610 and person 1608 are also located within FoV 1612. The radar system has a mapping from the FoV to the iMTM array 1604, which may be configured as a Look Up Table ("LUT"), as a formula, or as another mapping format that configures subarrays of the iMTM array 1600 to generate a beam toward individual portions of the FoV 1612. In this way, there is low latency dynamic adjustment of the radiation beam for beam forming and beam steering. The ability to capture multiple targets with a single subarray acts to further reduce the delay in detection and communication, reducing the time from detection to action.

As illustrated in FIG. 16, the mapping between the iMTM antenna array 1600 and the FoV 1612 is provided by FoV-to-MTM mapping unit 1604, which includes various entries for such correlation. This type of mapping format may be dynamically adjusted to keep pace with the movement of vehicles; in addition, this information may be stored in a relational database or other device to assist the iMTM interface module 1606 in learning and improving over time. In this way and as described above, the iMTM interface module 1606 may use AI, machine learning, deep learning, an expert system, and/or other technology to improve performance of the iMTM radar system for target detection and identification.

As a vehicle travels, there are different FoV snapshots or slices, such as from a near-field to a far-field slice. From the perspective of a vehicle, there is a near-field FoV, a far-field FoV, and several mid-field FoVs, which may each be considered as a slice of information. The information may be stored according to angle of arrival, range to the target, velocity of the target, Doppler information from the received signal and so forth. In various examples and as illustrated in FIG. 5, these are referred to as Range-Doppler maps. Each slice corresponds to an instant in time as the car travels. The iMTM interface module 1606 determines which type of beam is broadcast for each FoV as a function of many parameters, including, for example, the speed of the car and the speed of a detected object in relation to the car. The iMTM interface module 1606 may also determine that for specific conditions, the beams are meant to reach a specific FoV, such as where the car is moving slowly, a given FoV may be sufficient, but if the car is moving rapidly, then there is a desire to reach a full FoV. Weather conditions will have an impact as well, such that if the car will take longer to react, stop or otherwise change the current driving conditions, then the iMTM interface module 1606 may desire to reach the longest FoV to allow the car time to react. This may be utilized for snow or icy conditions, which dramatically impact how quickly a car may decelerate and/or halt.

Some other considerations for antenna applications, such as for radar antennas used in vehicles, include the antenna design, capabilities, and receiver and transmitter configurations. A typical electronic system with an antenna array consists of two or more antenna elements, a beam forming network, and a receiver and/or transmitter. The beamforming network may consist of a Butler matrix or other antenna arrays combined with phase shifting elements. Many different antenna configurations can be utilized as an antenna element in the antenna array: simple dipole, monopole, printed patch design, Yagi antenna, and so forth. One of the primary goals for antennas mounted on/in the car is to achieve a compact and aesthetic design. Other goals relate to the type of communication signal used for the radar beam. One type of modulation is the FMCW modulation, which is effective in radar applications, as radar does not need to pulse, but rather transmits continuously. FMCW is a continuous carrier modulated waveform that is transmitted as a continuous periodic function, such as sinusoid, sawtooth, triangular and so forth. The sweep time, or sweep period, $T_s$, is the time for transmission of one period of the waveform. The signal transmitted during one sweep period is referred to as a chirp. There is a difference in the frequency of the transmit and receive signals that is referred to as the beat frequency, $b_f$. The range of the antenna, r, is the distance from the antenna to a detected target, and is a function of the sweep period, beat frequency, the speed of light, c, and the sweep bandwidth, $B_s$. A moving target induces a Doppler frequency shift that enables radar to detect the relative velocity of the target with respect to the antenna. The phase difference between the transmit and receive signals provides location information, while the frequency shift identifies a speed. In the case of moving targets, the signal phase distortions may impact the performance of the antenna array. One way to offset such distortion is to use multiple subarrays at the transmit and receive sides to filter out these impurities. Another way is to adjust the antenna calibration on-the-fly to reduce the phase distortion of moving targets.

Traditional phase shifting may be used to control the beam of an antenna. Phased array antennas have multiple elements that are fed so as to have a variable phase or time-delay at each element and so that the beam scans from different angles. The multiple elements provide radiation patterns with lower sidelobes and enables careful beam shaping. The beam can be repositioned for more directed and efficient operation.

The various examples described herein provide an iMTM antenna structure that provides phase shifting without the active elements required to change the phase, or in the traditional ways. The iMTM antenna structures of various examples use the characteristics of the metamaterial shape and configuration to provide phase shifts without the use of mechanical or electrical phase shifters.

Figure 17:
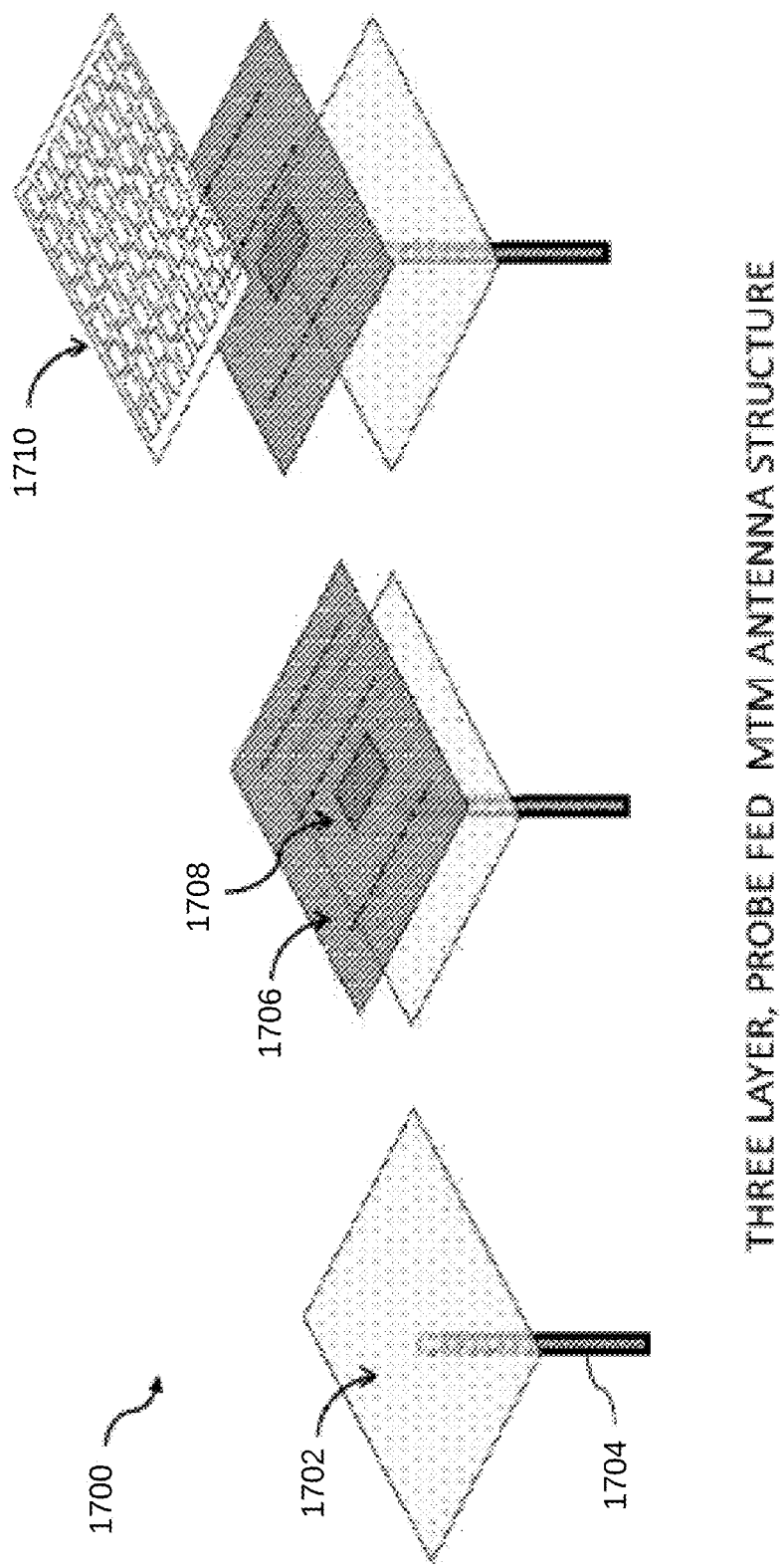
FIGS. 17-18 are schematic diagrams of example iMTM antenna structures.

The iMTM antenna arrays described herein may be fed by a variety of configurations, such as a probe feed or a substrate integrated waveguide and so forth. In one example of an iMTM antenna structure 1700, illustrated in FIG. 17, a signal source is provided as a probe 1704, which may be coupled to a ground plane 1702. The probe 1704 supplies the source signal for the antenna 1700 to generate a modulated EM waveform. A second layer 1706 is positioned over the ground plane 1702. The second layer 1706 is made of a dielectric material and has an antenna structure 1708 configured thereon. This antenna 1708 is designed to receive the source signal and generate a relatively flat wave front to meet the iMTM layer 1710. The antenna 1708 may be a dipole antenna or any other antenna capable of generating a relatively uniform and flat wave front across the entirety of the second layer 1706. The ability to provide the signal to the iMTM array or to individual subarrays and/or individual unit cells, enables the iMTM antenna 1700 to radiate EM beamforms that are steerable. The iMTM unit cells are controlled by changes to the reactance behavior of the iMTM unit cells, such as through a variable capacitor or varactor(s) within each iMTM cell.

Figure 18:
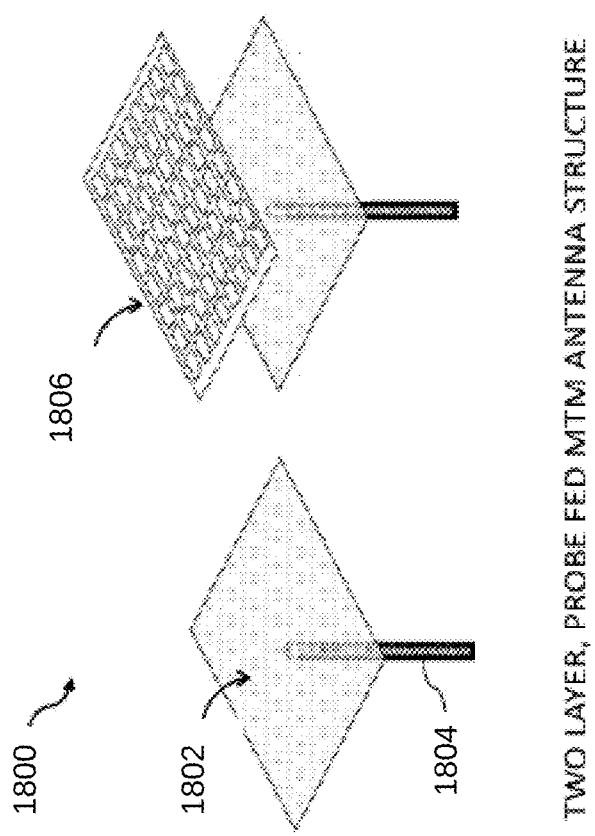

Another example is illustrated in FIG. 18, which is a two-layer, probe fed iMTM antenna structure 1800. As in the example of FIG. 17, a probe 1804 supplies the signal to a ground plane layer 1802. In this example, an iMTM antenna array 1806 is placed over the ground plane with no middle layer. The source signal is distributed across the ground plane 1802 such that a relatively flat wave form is presented to the iMTM antenna array 1806. The iMTM antenna array 1806 then radiates the transmission signal as described herein, wherein each unit cell may transmit individually or transmit as a sub-array.

Figure 19:
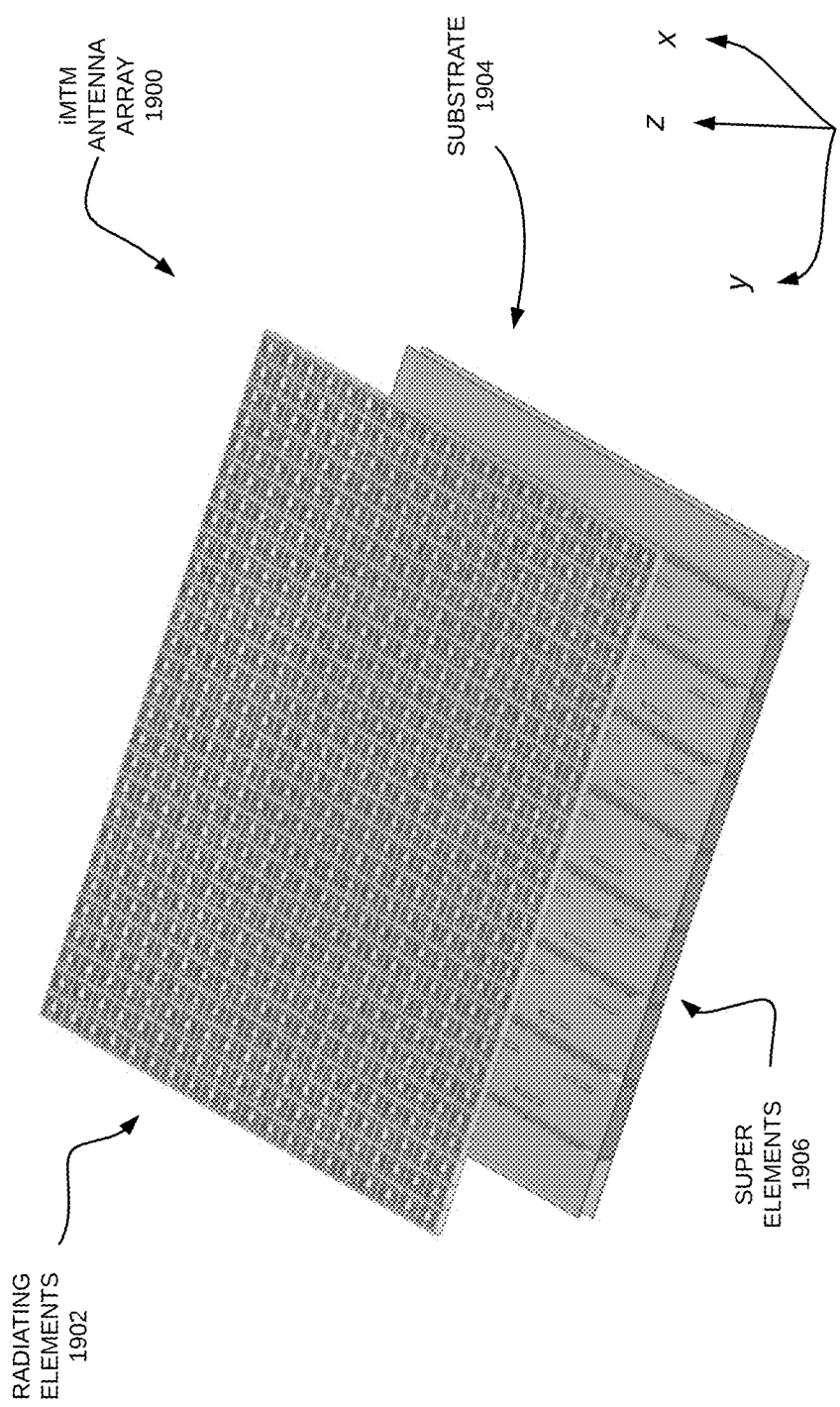
FIG. 19 is a schematic diagram of an example iMTM antenna array.

FIG. 19 illustrates an example of an iMTM antenna array 1900 having radiating elements 1902, which are each iMTM cells. The array 1900 of iMTM cells may operate as a single array or may be controlled to operate as multiple subarrays, wherein each of the array or subarrays acts to generate a radiation beamform that is steerable through control of the reactance of individual iMTM unit cells. The feed structure for the iMTM antenna array structure 1900 is a substrate 1904 having multiple conductive layers and a dielectric layer sandwiched therebetween. The feed 1904 is configured as super elements 1906 that are along the x-direction of the iMTM antenna array 1900, wherein each super element includes a plurality of slots or discontinuities in the conductive layer proximate the radiating elements 1902. A signal is provided to each of the super elements 1906 that radiates through the slots in the super elements and feeds the radiating elements 1902. The various super elements 1906 may be fed with signals of different phase, thus providing phase shifting in the y-direction, while the iMTM antenna array 1900 may be controlled so as to shift the phase of the transmission signal in the y-direction and/or the x-direction, wherein the signal transmits in the z-direction. The ability to control the directivity and phase of the transmission signal provides flexibility and responsive behavior for wireless communications and radar applications.

In various examples, the iMTM antenna array 1900 may be positioned within a vehicle as part of an iMTM radar system (e.g., iMTM radar system 100 of FIG. 1), or an infrastructure point within an environment, such as a street lamp or building. In this way, the iMTM array 1900 may scan the environment with predetermined knowledge of the area, such as road dimensions, side walk dimensions, traffic signal locations, cross-walk dimensions and so forth. It is appreciated that the dimensions and size provided in the drawings given in these descriptions is not meant to be limiting, but rather is provided for clarity of understanding of the reader.

Figure 20:
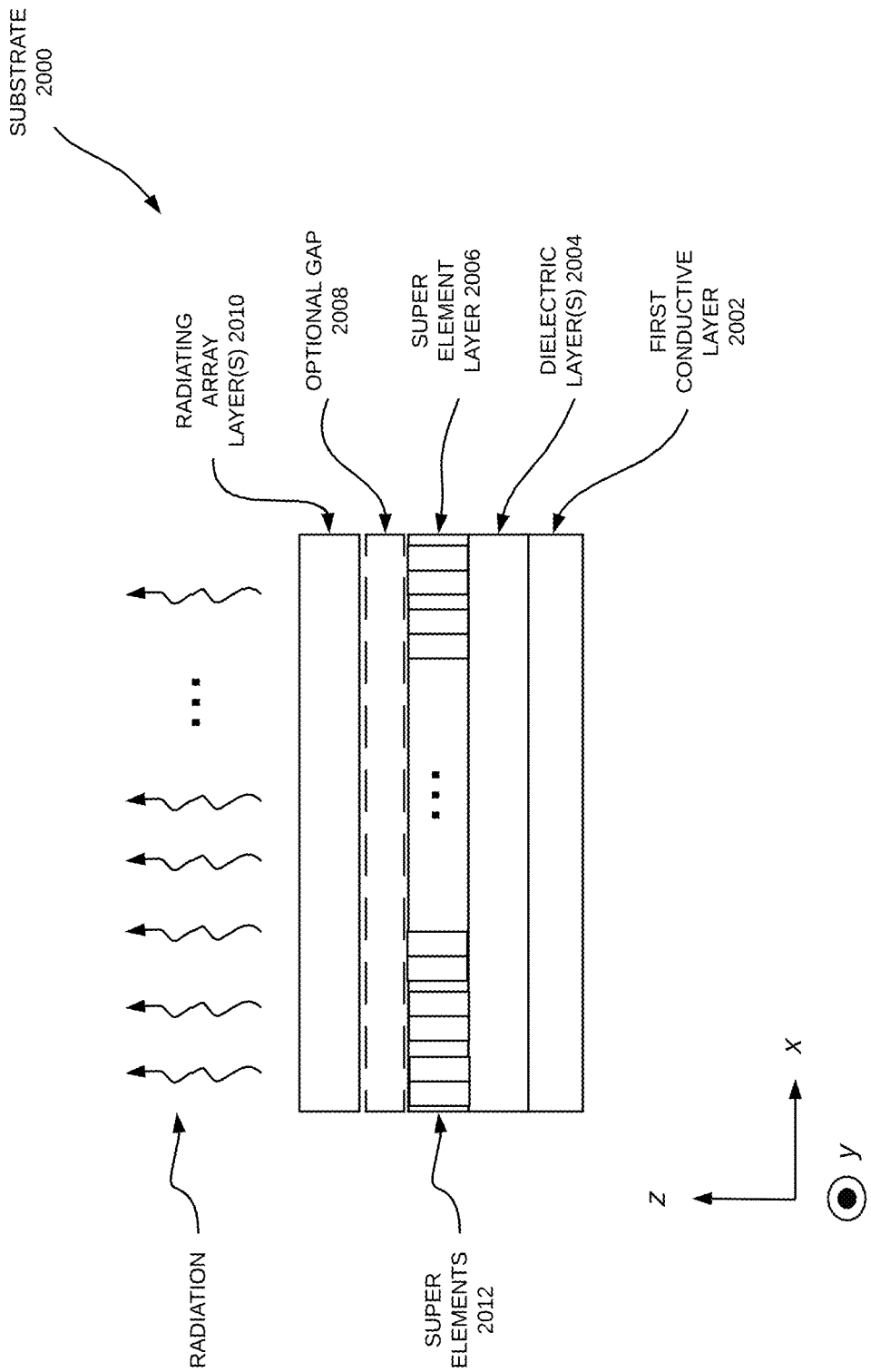
FIG. 20 is another perspective of the iMTM antenna array of FIG. 19 illustrating its various layers in accordance with various examples.

FIG. 20 is another perspective of the iMTM antenna array 1900 of FIG. 19 illustrating its various layers. Substrate 2000 includes a first conductive layer 2002, a dielectric layer(s) 2004, and a super element layer 2006. The super elements are formed by conductive and non-conductive traces on a top portion of the super element layer 2006 and by vias formed through the super element layer 2006 and through the dielectric layer(s) 2004. The vias (not shown) are lined with conductive material, or may be filled with conductive material, so as to form channels defining the super elements 2012 and providing a wave guide function to maintain propagation of the signals fed into the super elements 2012. An optional gap 2008 may be placed between the super element layer 2006 and the radiating array layer 2010, which contains the iMTM cells. The longitudinal direction of the super elements 2012 in the perspective of FIG. 20 is into the page, in the y-direction, with the signal radiating in the z-direction. Again, note these directions are for illustration and description purposes only and do not necessarily correlate to absolute references. Note also that the iMTM array 2000 may be part of a sensor fusion module (e.g., sensor fusion module 1220 of FIG. 12) within the vehicle or infrastructure, whereby different locations share information and communicate with each other to provide information ahead of action, such as to identify a speeding car several blocks before it actually is in range of a given sensor. One or multiple sensors may provide alerts to other sensors in the environment to be on the look-out for a speeder.

It is appreciated that the disclosed examples are a dramatic contrast to the traditional complex systems incorporating multiple antennas controlled by digital beam forming. The disclosed examples increase the speed and flexibility of conventional systems, while reducing the footprint and expanding performance.

The iMTM radar system 100 of FIG. 1 may implement the various aspects, configurations, processes and modules described throughout this description. The iMTM radar system 100 is configured for placement in an autonomous driving system (e.g., autonomous driving system 1200 of FIG. 12) or in another structure in an environment (e.g., buildings, bill boards along roads, road signs, traffic lights, etc.) to complement and supplement information of individual vehicles, devices and so forth. The iMTM radar system scans the environment, and may incorporate infrastructure information and data, to alert drivers and vehicles as to conditions in their path or surrounding environment. The iMTM radar system is also able to identify targets and actions within the environment. The various examples described herein support autonomous driving with improved sensor performance, all-weather/all-condition detection, advanced decision-making algorithms and interaction with other sensors through sensor fusion. The iMTM radar system leverages intelligent metamaterial antenna structures and AI techniques to create a truly intelligent digital eye for autonomous vehicles.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. An Intelligent Metamaterial ("iMTM") interface module for use with an iMTM antenna module in a radar system, comprising:
    a target detection module configured to detect a target in a radar point cloud encoded from radar data;
    a decision neural network configured to determine an action for the iMTM antenna module to perform based on the target detection in the radar point cloud; and
    a beam control module configured to control the action for the iMTM antenna module.

2. The iMTM interface module of claim 1, wherein the target detection module comprises a convolutional neural network.

3. The iMTM interface module of claim 1, wherein the radar point cloud is pre-processed to correct for non-line-of-sight reflections in a non-line-of-sight correction module.

4. The iMTM interface module of claim 3, wherein the non-line-of-sight correction module comprises a planar surface identification module and a non-line-of-sight reflection remapping module configured to generate the radar point cloud for the target detection module.

5. The iMTM interface module of claim 1, wherein the action comprises an instruction to the iMTM antenna module for generating a beam with a set of parameters and at a phase shift.

6. The iMTM interface module of claim 5, wherein to control the action for the iMTM antenna module comprises to determine the set of parameters and the phase shift for the beam.

7. An Intelligent Metamaterial ("iMTM") interface module for a radar system, comprising:
    an iMTM antenna module configured to radiate a transmission signal and generate radar data capturing a surrounding environment;
    a target detection module configured to detect and identify a target in a radar point cloud encoded from the radar data; and
    a beam control module configured to control the iMTM antenna module.

8. The iMTM interface module of claim 7, wherein the iMTM antenna module comprises an iMTM antenna structure having a plurality of iMTM antenna arrays.

9. The iMTM interface module of claim 8, wherein the iMTM antenna module is further configured to radiate the transmission signal with the iMTM antenna structure.

10. The iMTM interface module of claim 8, wherein each of the plurality of iMTM antenna arrays comprises a plurality of iMTM cells configured into a plurality of subarrays and each of the plurality of iMTM antenna arrays provides a plurality of phase shifts in the transmission signal.

11. The iMTM interface module of claim 8, wherein the iMTM antenna structure comprises a feed distribution module having an impedance matching structure and a reactance control structure.

12. The iMTM interface module of claim 7, wherein the target detection module comprises a convolutional neural network that is coupled to a decision neural network.

13. The iMTM interface module of claim 7, wherein the radar point cloud is pre-processed to correct for non-line-of-sight reflections in a non-line-of-sight correction module.

14. The iMTM interface module of claim 7, wherein a data pre-processing module is used for encoding the radar data into the radar point cloud.

15. The iMTM interface module of claim 14, wherein the data pre-processing module comprises an autoencoder.

16. A method for using an Intelligent Metamaterial ("iMTM") interface module for a radar system, comprising:
    directing an Intelligent Metamaterial ("iMTM") antenna structure to radiate RF beams with determined parameters;
    receiving reflections from the RF beams;
    generating, from the reflections, radar data capturing a surrounding environment;
    identifying a target in a radar point cloud encoded from the radar data; and
    determining a next action for the iMTM antenna structure.

17. The method of claim 16, wherein directing the iMTM antenna structure to radiate RF beams with determined parameters comprises directing a plurality of iMTM antenna arrays in the iMTM antenna structure to radiate RF beams with a set of directions and phase shifts.

18. The method of claim 16, further comprising:
    encoding the radar data into the radar point cloud with non-line-of-sight correction.

19. The method of claim 16, further comprising:
    extracting micro-doppler signals from the radar data.

20. The method of claim 19, wherein identifying the target comprises using the micro-doppler signals and a convolutional neural network coupled to a decision neural network to identify the target.

* * * * *